United States Patent [19]
Miyazawa et al.

[11] Patent Number: 5,952,760
[45] Date of Patent: Sep. 14, 1999

[54] BRUSHLESS DC MOTOR

[75] Inventors: Hiroshi Miyazawa; Kinya Matsuzawa; Norio Ito; Yasushi Soya; Koichi Saito, all of Suwa, Japan

[73] Assignee: Seiko Epson Corporation, Tokyo, Japan

[21] Appl. No.: 08/968,889

[22] Filed: Nov. 6, 1997

Related U.S. Application Data

[62] Continuation of application No. 08/722,982, Sep. 30, 1996, abandoned, which is a division of application No. 08/240,702, filed as application No. PCT/JP92/01464, Aug. 10, 1993.

[51] Int. Cl.$^6$ ................................................. H02K 37/00
[52] U.S. Cl. .......................... 310/194; 310/152; 310/257
[58] Field of Search .................................. 310/152, 181, 310/194, 186, 256, 257, 267

[56] References Cited

U.S. PATENT DOCUMENTS

| | | |
|---|---|---|
| 4,501,981 | 2/1985 | Hansen .................................. 310/49 R |
| 4,891,567 | 1/1990 | Fujitani et al. ........................ 310/68 R |
| 4,899,075 | 2/1990 | Hasebe .................................... 310/257 |
| 4,973,866 | 11/1990 | Wang ..................................... 310/49 R |
| 5,043,613 | 8/1991 | Kurata et al. .......................... 310/49 R |

Primary Examiner—Thomas M. Dougherty
Attorney, Agent, or Firm—Kanesaka & Takeuchi

[57] ABSTRACT

A brushless DC motor, whose stator (10) is a combination of stator yokes (11, 16), a bobbin (14) on which a magnetic field coil (15) is wound and to which terminal pins are provided, and a base plate (20). The stator (10) is fixed to the base plate (20) by a protrusion (12c) provided on the bobbin (14) or by a flange (18a) formed on a bearing. The widths of magnetic poles (11a, 16a) of the stator, which are measured in the circumferential direction of the stator, are smaller than the width of one of the poles of a rotor magnet (5). Thereby, the position of a stable point is a maximum excitation torque position. Further, a magnetic pole sensing element (21) is provided at a place which is shifted in the circumferential direction from the middle position of one of the magnetic poles of the rotor magnet (5).

4 Claims, 33 Drawing Sheets

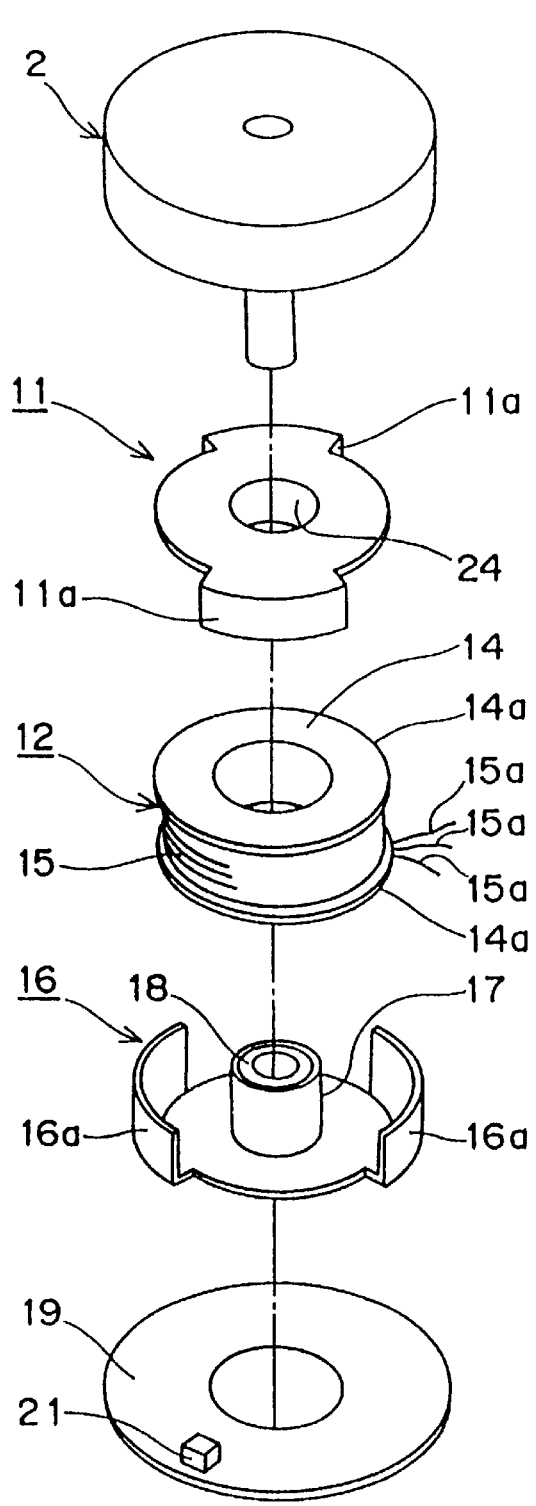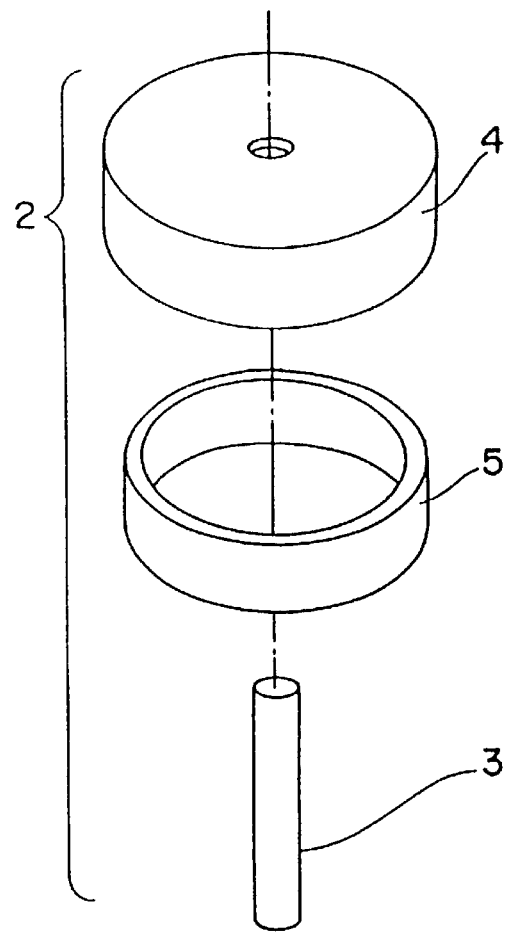

FIG. 58

| m/P × 100 (%) | Ψ/θ × 100 (%) |
|---|---|
| 9 0 | 9 4 |
| 8 5 | 8 8 |
| 8 0 | 8 3 |
| 7 5 | 7 8 |
| 7 0 | 7 3 |

FIG. 59

| m/P × 100 (%) | Ψ/θ × 100 (%) |
|---|---|
| 9 0 | 9 6 |
| 8 5 | 9 0 |
| 8 0 | 8 5 |
| 7 5 | 8 0 |
| 7 0 | 7 4 |

FIG. 60

| MAGNETIC POLE WIDTH | SHIFTING OF MAGNETIC POLE SENSING ELEMENT (ELECTRIC ANGLE) | | | | | | | | | | |
|---|---|---|---|---|---|---|---|---|---|---|---|
| $\psi/\theta \times 100\%$ | 0 | 5 | 15 | 25 | 35 | 45 | 55 | 65 | 75 | 85 | 90 |
| 95 | X | ○ | ○ | ○ | ○ | ○ | ○ | △ | △ | △ | X |
| 90 | X | ◎ | ◎ | ◎ | ◎ | ◎ | ○ | △ | △ | △ | X |
| 85 | X | ◎ | ◎ | ◎ | ◎ | ◎ | ○ | △ | △ | △ | X |
| 80 | X | ◎ | ◎ | ◎ | ◎ | ◎ | ○ | △ | △ | △ | X |
| 75 | X | ○ | ○ | ○ | ○ | ○ | ○ | △ | △ | △ | X |
| 70 | X | △ | △ | △ | △ | △ | △ | △ | △ | △ | X |
| 65 | X | △ | △ | △ | △ | △ | △ | △ | △ | △ | X |
| 60 | X | △X | △X | △X | △X | △X | △X | △X | △X | △X | X |
| 55 | X | △X | △X | △X | △X | △X | △X | △X | △X | △X | X |
| 50 | X | △X | △X | △X | △X | △X | △X | △X | △X | △X | X |
| 45 | X | X | X | X | X | X | X | X | X | X | X |
| 40 | X | X | X | X | X | X | X | X | X | X | X |

◎ --- EXCELLENT IN STARTING PERFORMANCE AND MOTOR CHARACTERISTICS.
○ --- GOOD IN STARTING PERFORMANCE AND MOTOR CHARACTERISTICS.
△ --- SLIGHTLY DEFECTIVE IN EITHER STARTING PERFORMANCE AND MOTOR CHARACTERISTICS.
△X --- DEFECTIVE IN STARTING PERFORMANCE. USABLE WITH A GOOD IDEA.
X --- STARTING IMPOSSIBLE.

BRUSHLESS DC MOTOR

This application is a continuation of application Ser. No. 08/722,982, filed Sep. 30, 1996, now abandoned, which is a division of Ser. No. 08/240,702 filed Jun. 2, 1994, which was the National Stage of International Application No. PCT/JP92/01464 filed Aug. 10, 1993.

TECHNICAL FIELD

This invention relates to a brushless DC motor, which has a magnetic field winding on stator yokes, a permanent magnet on a rotor and no brush, and particularly to a motor structure.

BACKGROUND ART

Conventional brushless DC motors known include a core type motor shown in FIG. 50 and a coreless type motor as shown in FIG. 51 to FIG. 57.

As shown in FIG. 50, the above core type motor 52 has a stator yoke 53 formed by layering electromagnetic steel plates which are punched out into a certain form, and has a magnetic field coil 54 disposed in a slot section of the stator yoke 53 in the insulated state. A rotor magnet 56 is disposed on a rotor 55. And, a motor section comprises the stator yoke 53 and the rotor 55, and a circuit unit section 57 consists of a circuit element and the like.

The above coreless type motor 60 has a magnetic field coil 59, which is formed in the shape of a ring by a self-fusing line, disposed in "an air-core type stator yoke 58" as shown in FIG. 51. The magnetic field coil 59 is formed as shown in, for example, FIG. 52 and FIG. 53. And, a rotor 61 is provided with a rotor magnet 63. And, the stator yoke 58 and the rotor 61 form a motor section, and a circuit unit 76 consists of a circuit element and the like.

In the motors 51 and 60 having the above structures, assembling can be made by fitting from one direction of a motor bearing supporter (boss).

The coreless type motor 60 is known described in, for example, Japanese Patent Application Laid-open Print No. 23754/1989. The brushless DC motor 60 of this type has a rotor 61 consisted of a cup-shaped rotor yoke 62, a ring-shaped rotor magnet 63 adhered to the inner periphery of the rotor yoke, and a shaft 65 fitted to the center of the rotor yoke 62 with a bush 64 as shown in FIG. 54. In the figure, 66 represents a turn table.

As shown in FIG. 55, a stator 67 comprises first and second stator yokes 68, 69 made of a soft magnetic metal plate, and a coil unit 70 disposed between the stator yokes 68, 69. Both the stator yokes 68, 69 have magnetic poles 68a, 69a formed which are extended from the center radially toward outward and bent at right angles, and have rings 71, 72 integrally formed at the center along the bent direction of the magnetic poles 68a, 69a. In the figure, four poles are shown.

The first stator yoke 68 and the second stator yoke 69 of the stator 67 are put together with the coil unit therebetween, the ring 71 and the other ring 72 are joined to be magnetically connected to form a magnetic circuit, keeping a certain gap from the circumferential face of the rotor magnet 63 of the rotor 61, and the magnetic poles 68a, 69a of the first and second stator yokes 68, 69 are alternately disposed in the circumferential direction.

Further, a sleeve 73 is fitted within the ring 71 of the stator 67, and the shaft 65 of the rotor 61 is supported in the sleeve 73 via a bearing 74. To the bottom of the sleeve 73, a base plate 75 is fitted to support the stator 67, and a circuit board 76 is fixed to the base plate 75. In the figure, 77 represents a magnetic pole sensing element to detect a magnetic pole of the rotor.

Besides, as a chucking magnet to adsorb and fix a revolving work, a chucking magnet 79 magnetized as shown in FIG. 57 has been used heretofore.

Furthermore, as brushless DC motors structured using stator yokes which are formed by bending a soft magnetic metal plate, for example, Japanese Patent Application Laid-open Print No. 23754/1989 and Japanese Patent Application Laid-open Print No. 214458/1990 are known. In such motors, magnetic poles are formed in an asymmetrical shape to shift the rotor's static stable position from the position of excitation torque 0, the magnetic poles of one stator yoke have a different shape from those of the other stator yoke, and the position of each stator is shifted to cause magnetic unbalance to shift the rotor's stable position, thereby eliminating a dead point of the motor revolution.

However, the above conventional brushless DC motors have the following structural drawbacks regardless of the core or coreless type.

1) A boss is disposed for a bearing at the center of the motor, a relatively large hole is disposed at the center of the circuit unit to avoid it, this hole spoils a degree of freedom for arrangement and an effective area for circuit parts, and therefore, the shape of the motor body becomes large.

2) As the circuit unit is disposed to be covered by the motor section, when assembling is completed, removal of the circuit unit alone can not be made. And, replacement, modification and adjustment were difficult.

3) The end of the winding of the magnetic field coil is connected to the circuit board by leading around the magnetic field coil to wire, so that a layer short or the like easily takes place due to the breaking of wire or contact of windings during operation, and in particular, the coreless type has a drawback of causing a lot of troubles in wiring and increasing work manhours.

And, in particular, the coreless type motor had the following structural drawbacks.

1) As the stator has a structure to be fitted by mutually putting together the rings of both the stator yokes, precision is required in processing the rings, resulting in increasing costs and causing a lot of troubles in assembling.

2) As the sleeve for supporting the bearing is inserted in the fitted ring section, the number of parts is increased, increasing assembling works.

3) In miniaturizing the motor, magnetic saturation may be caused in the magnetic circuit around the shaft.

4) As the turn table which is put on the rotor is separately formed, the assembling work is increased, and it is difficult to secure the flatness of the turn table.

5) As the base plate is fitted at the bottom of the sleeve passed through the stator, to secure perpendicularity of the sleeve, processing precision of the fitting part of the base plate is required, and sufficient strength cannot be easily obtained. As shown in FIG. 56, the stator 67 can be fixed to the flat base plate 75 by screwing with a screw 78, but a disposing space cannot be provided between the base plate 75 and the stator 67, and it is difficult to dispose the circuit board and the magnetic pole sensing element.

6) And, when assembling, a fitting position of the magnetic pole sensing element has to be determined every time, degrading the precision of positioning and lowering efficiency of assembling work.

7) The chucking magnet 79 for adsorbing and fixing a revolving work is generally magnetized into upper and lower two poles, so that its attraction force is weak, and when the chucking magnet does not have a magnetic substance on the bottom face, leakage flux flows into the stator yoke or rotor yoke, causing a drawback of adversely effecting on the motor performance.

Further, regardless of the core or coreless type motor, there are following drawbacks in the motor characteristics.
1) As the excitation torque generated at the stable point position of the permanent magnet rotor is relatively small, the start up is unstable and can be self-activated only under a very limited condition, and a large start torque cannot be obtained.
2) Since a magnetic balance has to be destroyed, a magnetic pole shape becomes special, and leakage flux is increased, thus the motor efficiency is lowered.
3) As the two stator yokes have different magnetic pole shapes, two press molds are required, and management of parts becomes complicated.

In view of the above, this invention is to solve the above drawbacks and aims to simplify the connection of the coil unit and the circuit unit, and makes it easy to replace the circuit unit alone and adjust even after the assembling of the motor, and reduces the number of fitting parts, facilitates the assembly, reduces manhour, improves the motor performance, and provides an inexpensive brushless DC motor having a high starting torque, providing starting ability in a wide range, having a high motor efficiency and productivity.

SUMMARY OF THE INVENTION

To accomplish the above objects, the brushless DC motor of a first invention of this application comprises a rotor having a ring- or segment-shaped rotor magnet magnetized in plural poles in the circumferential direction and having a shaft at the center of a rotor yoke, a stator having a pair of stator yokes, which have magnetic poles formed by bending a soft magnetic metal plate, put together as opposed and the magnetic poles disposed alternately in the circumferential direction with an air gap next to the rotor magnet, a coil unit having a magnetic field coil disposed on a synthetic resin coil bobbin having a flange at ends and disposed between the pair of stator yokes, and a circuit unit having a magnetic pole sensing element for detecting a magnetic pole of the rotor magnet disposed, characterized by protruding a projection from the flange of the coil bobbin and disposing a fitting hole at a position of the stator yoke corresponding to the projection, disposing a fitting hole in the base plate to which a motor is attached, disposing a through hole in the stator yoke contacting to the base plate, protruding a projection to be inserted in the through hole and the fitting hole of the flange of the coil bobbin, and protruding a terminal pin to bind the leading end of the magnetic field coil to the flange of the coil bobbin, disposing the through hole of the terminal pin in the stator yoke and base plate, and attaching the circuit unit to the base plate from outside which is opposite of the stator.

And, the terminal pin is disposed in plural numbers on the same circumference with the shaft at the center, and an interval between the adjacent terminal pins is at an equal pitch.

Further, the terminal pin is supported by synthetic resin, and the supporting part is integrally formed with the coil bobbin.

And, a groove to guide the end of the magnetic field coil is characterized by disposing on the supporting part of the terminal pin.

Besides, the terminal pins are disposed in plural numbers on the same circumference with the shaft at the center, and an interval between the adjacent terminal pins is at an equal pitch, and at the supporting part of the terminal pins made of synthetic resin, a groove to guide the terminal of the magnetic field coil is disposed.

The brushless DC motor of a second invention of the application comprises a rotor having a ring-shaped rotor magnet whose N and S poles alternately magnetized in the circumferential direction with the shaft disposed at the center of the rotor yoke, a stator having first and second stator yokes, which have magnetic poles formed by bending a soft magnetic metal plate, put together to oppose each other to alternately dispose the magnetic poles in the circumferential direction with an air gap next to the rotor magnet, a coil unit having a magnetic field coil disposed on a coil bobbin having a flange at ends disposed between the stator yokes, and a sleeve which is inserted in the through hole disposed at the center of the stator and supports the revolving shaft via a bearing therein, characterized by disposing a flange at one end of the bearing, forming a fitting projection having a convex cross section at the fitting part of the base plate to which the stator is fixed, and fixing the stator to the base plate by placing the fitting projection of the base plate between the stator and the flange of the bearing.

In addition, a fitting part having a projection is formed at both ends of the sleeve, and a fitting hole to which the fitting part is fitted is disposed in the first and second stator yokes.

And, the fitting part of the sleeve and the fitting holes of the first and second stator yokes are polygonal or non-circular.

Further, the coil bobbin has a pin integrally formed toward the circuit unit to bind the drawn line of the magnetic field coil.

And, the turn table put on the rotor yoke is integrally formed with the rotor yoke.

Besides, a fitting structure comprising a fitting recess and a fitting projection to mutually fit the rotor yoke and the turn table is disposed.

And, as the chucking magnet for adsorbing and fixing a revolving work is magnetized in many magnetic poles or has plural segments in combination, a magnetic path is formed in a shortest distance.

A cylindrical section is respectively formed at the center of the first and second stator yokes in the bent direction of the magnetic poles, and a cutout section which is coaxially fit mutually and positioned in the circumferential direction is disposed on each cylindrical section.

And, the sleeve is integrally formed with one of the first and second stator yokes, and a fitting hole is formed in the other of the stator yokes in which the leading end of the sleeve is fitted, and the bearing is fixed into the sleeve by press fitting or caulking.

Furthermore, a bearing is integrally formed with the base plate to which the stator is fixed.

And, the sleeve is made of a material having high magnetic permeability.

Besides, a fixing section, to which a magnetic pole sensing element for detecting a magnetic pole of the rotor is fixed, and its periphery are made of a non-magnetic material.

And, the fitting structure for positioning comprising a positioning pin and positioning holes fitting to the pin is disposed among a circuit board to which the magnetic pole detecting element for detecting the magnetic pole of the rotor is fixed, the base plate to which the circuit unit is fixed, and the stator.

Further, a pin for twining a drawn line of the magnetic field coil of the coil unit is protruded from the stator, and the leading end of the drawn line is fixed to the circuit unit.

The brushless DC motor of the second invention of the application, with a rotor having a rotor magnet forming a plurality of magnetic poles formed in the circumferential direction disposed on a rotor yoke, a stator having a plurality of magnetic poles alternately disposed on the stator yoke in the circumferential direction with an air gap next to the rotor magnet, a coil unit disposed on the stator yoke and having a magnetic field coil exciting the magnetic field of the stator, a magnetic pole sensing element for detecting polarity of the rotor magnet, and a cogging torque in the magnetic circuit consisting of the rotor and stator, sets the static stable point position where the rotor stops at the vicinity of the maximum torque point of the excited torque generated when an electric current is passed to the magnetic field coil, and the set position of the magnetic pole sensing element is set as shifted in the circumferential direction from the intermediate position of one magnetic pole of the rotor magnet.

And, an open angle of the magnetic pole of the stator which opens from the revolving center of the rotor in the circumferential direction is 75% or more and less than 100% with respect to the similar open angle of one magnetic pole of the rotor magnet.

Further, the set position of the magnetic pole sensing element is set at a position shifted in an opposite-revolving direction in a range of 5 to 45 degrees in electric angle.

And, the stator is structured by laminating many steel plates.

Besides, the stator is formed by casting.

Furthermore, the stator is formed by sintering.

BRIEF DESCRIPTION OF THE DRAWINGS

FIG. 37 An exploded perspective view of the rotor yoke according to a thirteenth embodiment of this invention.

FIG. 38 An exploded perspective view of the brushless DC motor according to a thirteenth embodiment of this invention.

BEST MODE FOR CARRYING OUT THE INVENTION

A first embodiment of this invention will be described with reference to the drawings.

Figure 1:
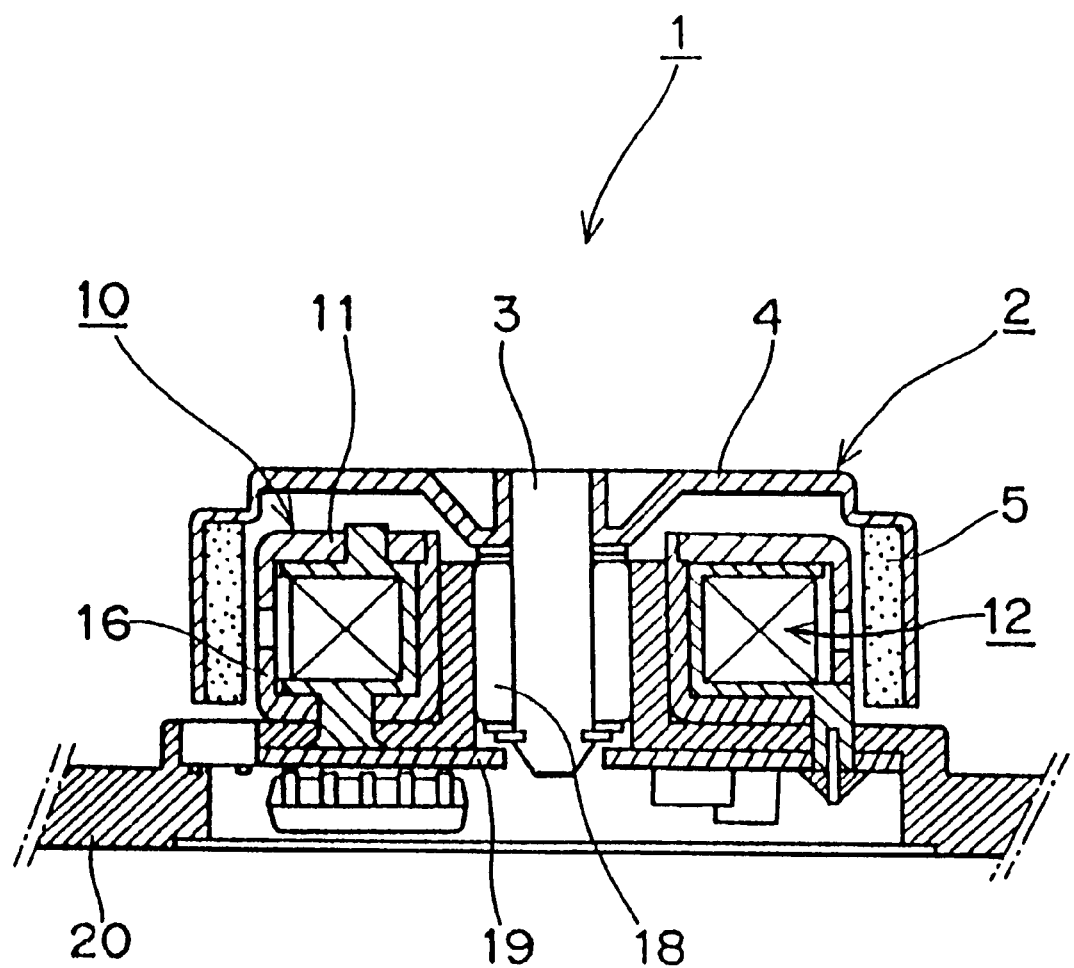
FIG. 1 A vertical sectional view of the brushless DC motor according to a first embodiment of this invention.
Figure 2:
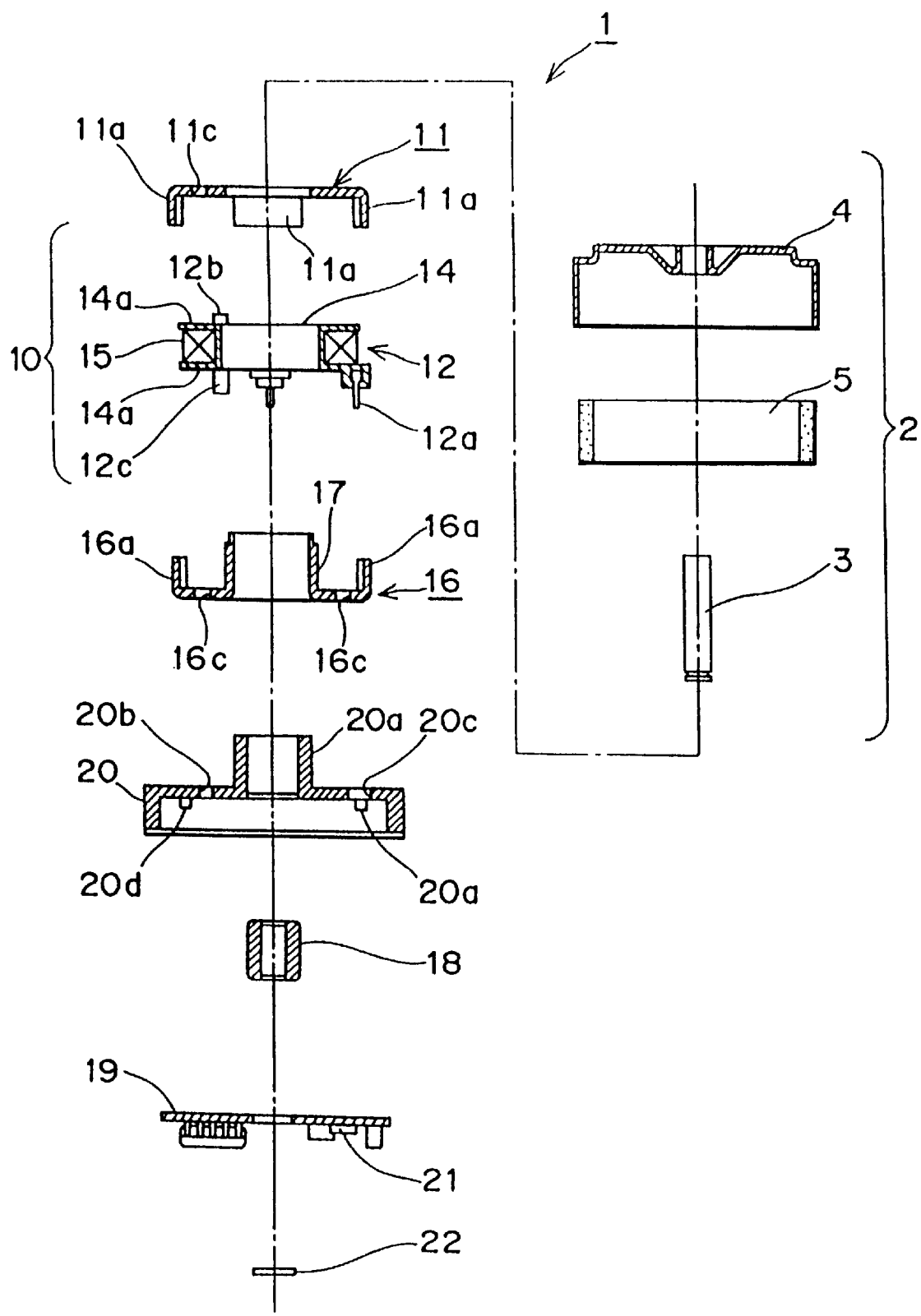
FIG. 2 An exploded sectional view of the brushless DC motor according to a first embodiment of this invention.
Figure 3:
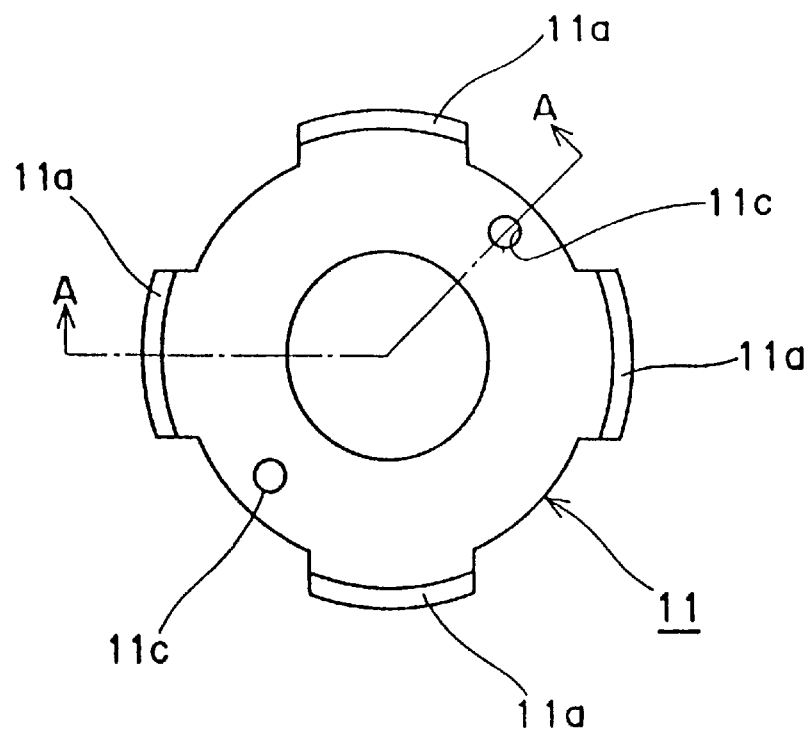
FIG. 3 A back view of the first stator yoke according to a first embodiment of this invention.
Figure 4:
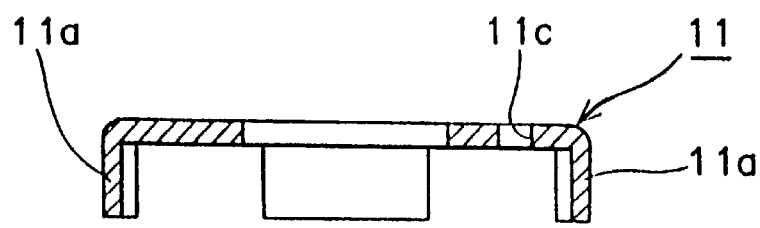
FIG. 4 A sectional view taken along line A—A of FIG. 3 according to a first embodiment of this invention.
Figure 5:
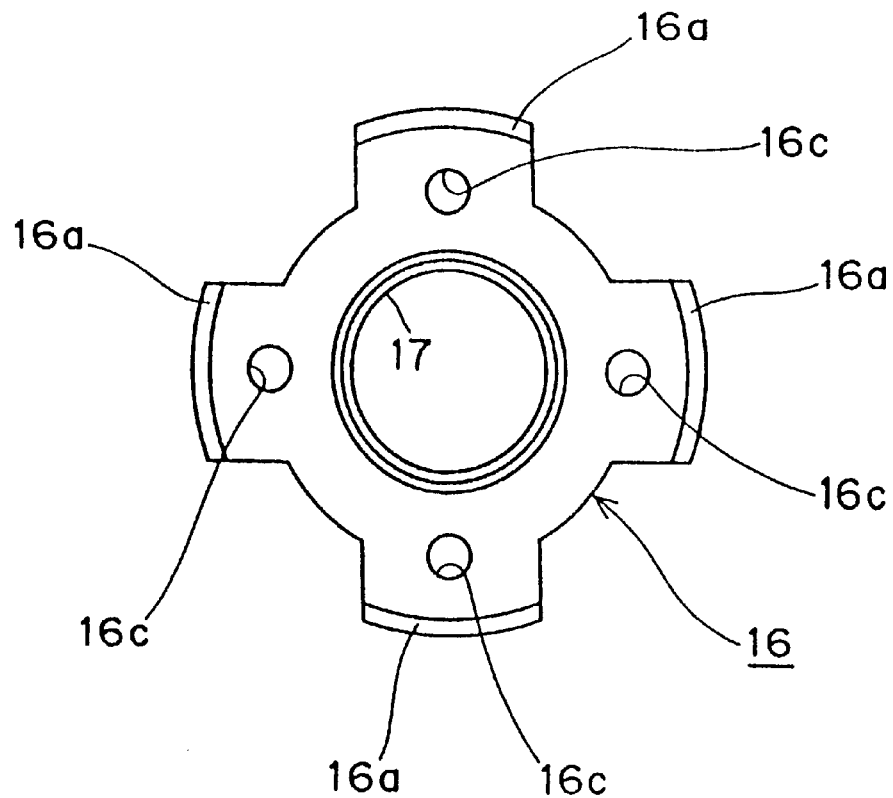
FIG. 5 A plan view of the second stator yoke according to a first embodiment of this invention.
Figure 6:
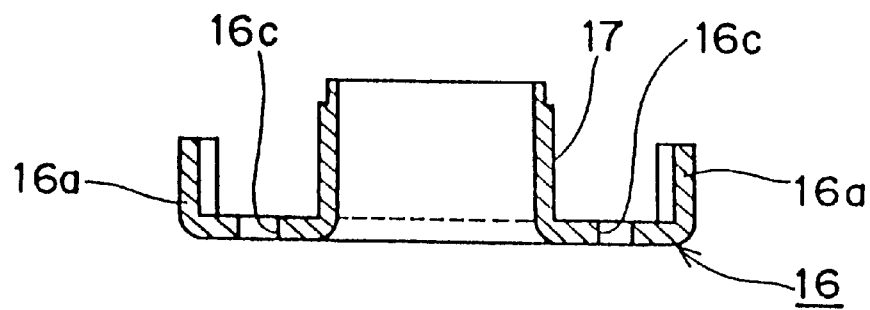
FIG. 6 A vertical sectional view of the second stator yoke according to a first embodiment of this invention.
Figure 7:
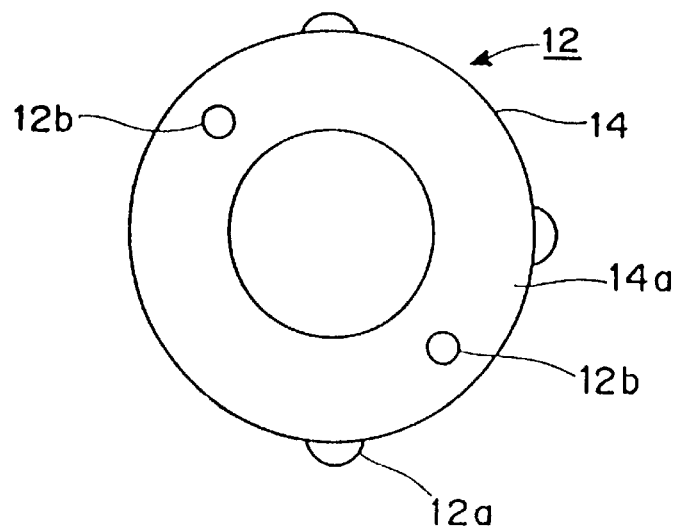
FIG. 7 A plan view of the coil unit according to a first embodiment of this invention.
Figure 8:
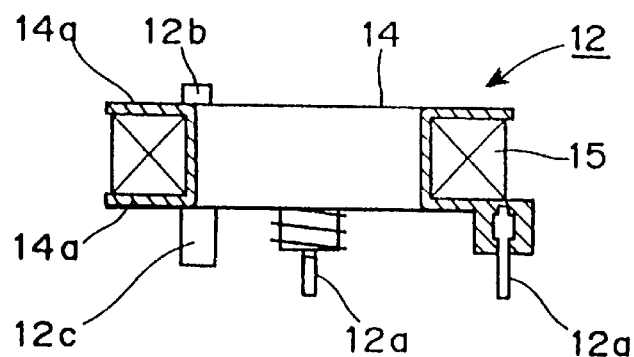
FIG. 8 A vertical sectional view of the coil unit according to a first embodiment of this invention.
Figure 9:
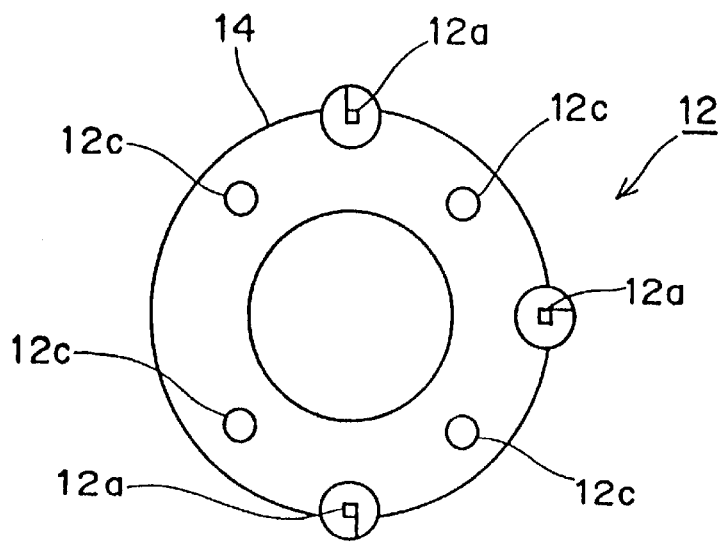
FIG. 9 A back view of the coil unit according to a first embodiment of this invention.
Figure 10:
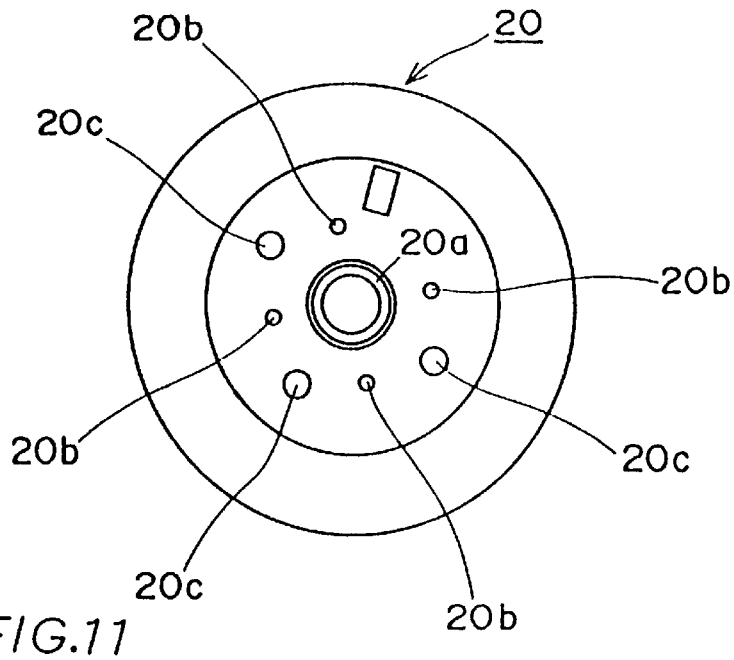
FIG. 10 A plan view of the base plate according to a first embodiment of this invention.
Figure 11:
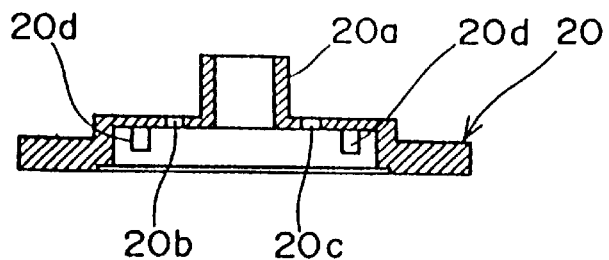
FIG. 11 A vertical sectional view of the base plate according to a first embodiment of this invention.
Figure 12:
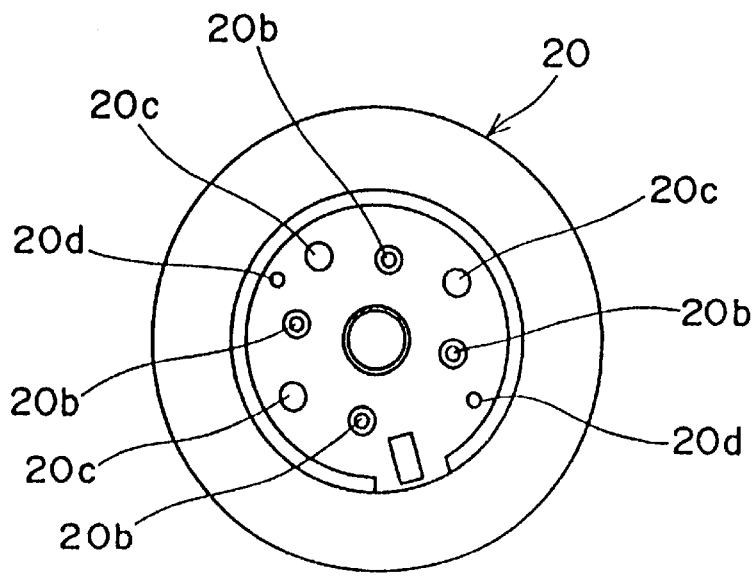
FIG. 12 A back view of the base plate according to a first embodiment of this invention.

FIG. 1 and FIG. 2 show a vertical sectional view and an exploded vertical sectional view of the brushless DC motor of this invention. In FIG. 1 and FIG. 2, 1 represents a brushless DC motor, 2 a rotor, 3 a shaft (revolving shaft), 10 a stator, 19 a circuit unit, 20 a base plate to which the motor 1 is attached.

The above rotor 2 has the shaft 3 press-fitted to the center of a rotor yoke 4 formed in the shape of a cup, and a rotor magnet (permanent magnet) 5 adhered to be fixed to the inner periphery of the rotor yoke 4. The rotor magnet 5 is formed in the shape of a ring, and has N and S poles alternately magnetized in the circumferential direction, magnetized in eight poles in this embodiment. The rotor magnet 5 may be a combination of a plurality of tile-shaped permanent magnets, or a sheet-shaped rubber magnet shaped into a ring.

The above stator 10 comprises a first stator yoke 11, a second stator yoke 16, a coil section 12, and a bearing 18 rotatably supporting the shaft 3. The first stator yoke 11 and the second stator yoke 16 are formed by punching a soft magnetic metal plate out into a prescribed shape, and the punched parts extending in the radial direction are bent at right angles to form magnetic poles 11a, 16a. And, a cylindrical part 17 is integrally formed with the second stator yoke 16. In this embodiment, as the motor 1 has eight poles, the stator yokes 11, 16 each have four magnetic poles 11a, 16a formed at certain intervals in the circumferential direction. And, the stator yoke 11 and the second stator yoke 16 have the coil unit 12 to be described afterward disposed therebetween, and are put together to mutually face the magnetic poles 11a and 16a of the stator yokes 11 and 16 so that the magnetic poles 11a, 16a are alternately disposed in the circumferential direction.

The above coil unit 12 comprises a bobbin 14 made of resin and having a flange 14a at either end, and a magnetic field coil 15 wound on the bobbin. And, the cylindrical part 17 of the second stator yoke 16 is inserted into the bobbin 14. Further, the flanges 14a of the bobbin 14 have a plurality of terminal pins 12a which are protruded in the axial direction of the motor 1, pins 12b for determining the assembling position of the stator yoke 11 and the second stator yoke 16 in a radial direction, and pins 12c which are used to fix the second stator yoke 16 to the base plate 20.

And, the base plate 20 supporting the stator 10 has a support 20a at the center to support the rotor 2. Further, holes 20b for fixing the stator 10 and holes 20c for electrically connecting the magnetic field coil 15 and the circuit unit 19 are formed in the base plate 20, and the circuit unit 19, which has a magnetic pole sensing element 21 for detecting a magnetic pole of the rotor magnet 5, is inserted for fixing in the same direction with the shaft 18 from the outside which is on the opposite side of the stator 10. And, after assembling, a washer 22 is fitted to the leading end of the shaft 3 of the rotor 2 to prevent the shaft 3 from coming off. And, the rotor 2 and the stator 10 constitute a motor section.

Further, details will be described with reference to FIG. 3 through FIG. 12.

The coil section 12 to be placed between the first stator yoke 11 and the second stator yoke 16 is inserted with the pins 12c of the coil unit 12 aligned with the holes 16c of the second stator yoke 16, the holes 11c of the first stator yoke 11 is aligned with the pins 12b of the coil unit 12, and the first stator yoke 11 and the second stator yoke 16 are joined and fixed, then the leading ends of the pins 12b inserted are fixed by thermal caulking. The first stator yoke 11 and the second stator yoke 16 may be fixed by press fitting or mechanically caulking by means of a press. A magnetic circuit is constructed in a good balance by the first stator yoke 11 and the second stator yoke 16.

To attach the fixed stator 10 to the base plate 20 for supporting, the pins 12c of the coil unit 12 are inserted into the holes 20b of the base plate 20, and fixed to the base plate 20 from the opposite side of the stator 10 by thermal caulking. The stator 10 and the circuit unit 19 are electrically connected by inserting the terminal pins 12a of the coil unit 12 into the holes 20c of the base plate 20, and soldering to the circuit unit 19 to fix, and at the same time, the stator 10 is fixed to the base plate 20 and the circuit unit 19. Further, the magnetic pole sensing element 21 is attached to the circuit unit 19, and the circuit unit 19 is guided and fixed by pins 20d of the base plate 20 so as to be accurately positioned with the stator 10.

Thus, according to the first embodiment, the stator is easily positioned by the holes of the first stator yoke and the synthetic resin projections of the coil unit, and the stator is accurately and easily fixed to the base plate by the holes of the second stator unit and the synthetic resin projections of the coil unit. The plurality of terminal pins protruded from the flanges of the coil bobbin allows to easily connect a drawn line of the magnetic field coil to the circuit unit, and has an effect that the magnetic pole sensing element of the rotor magnet can be easily fixed at an appropriate position.

Figure 13:
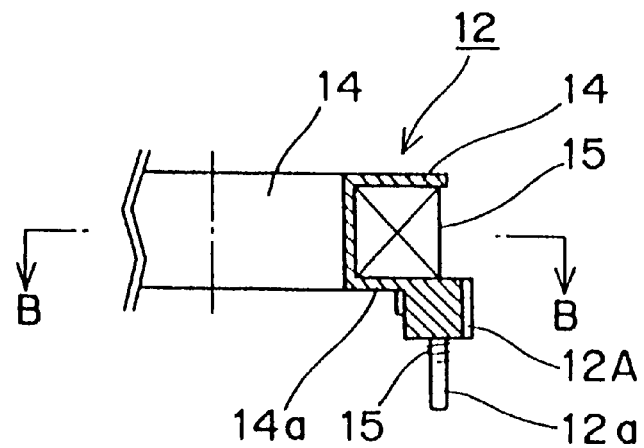
FIG. 13 A vertical sectional view of the essential part of the coil unit according to a second embodiment of this invention.
Figure 14:
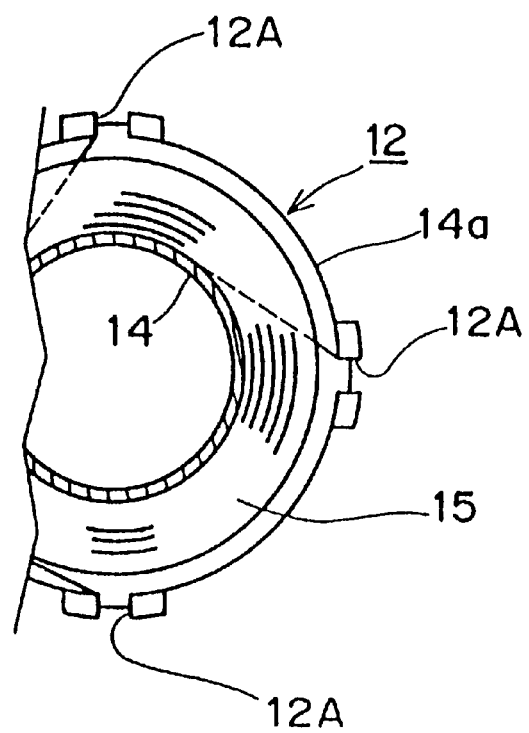
FIG. 14 A sectional view taken along line B—B of FIG. 13 according to a second embodiment of this invention.

Now, a second embodiment of this invention will be described. FIG. 13 and FIG. 14 show this embodiment.

In FIG. 13 and FIG. 14, a drawn line 15 is wound around the coil bobbin 14, the terminal pins 12a are integrally formed with the coil bobbin 14 on the flange 14a, and the drawn line 15 has grooves 12A formed to allow easy binding of its leading end on the terminal pins 12a and to prevent the breakage of wire.

Thus, according to the second embodiment, since supporting parts of the terminal pins are integrally formed with the coil bobbin using synthetic resin, a distance between the terminal pins is properly determined and the size of a press-fitting part is easily controlled. Further, since the drawn line guide grooves are disposed, yield of wire breakage is improved.

Figure 15:
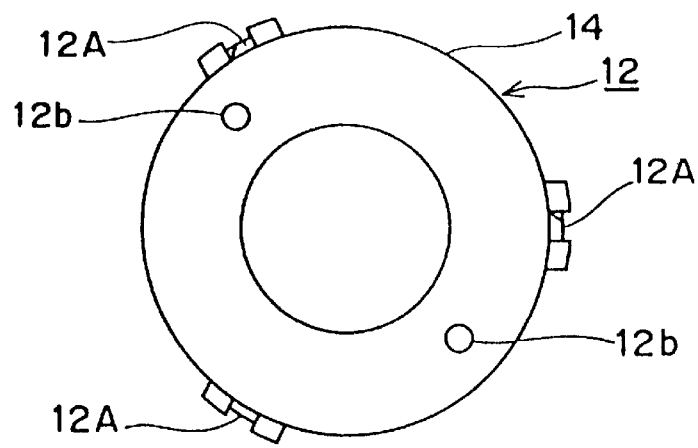
FIG. 15 A plan view of the coil unit according to a third embodiment of this invention.
Figure 16:
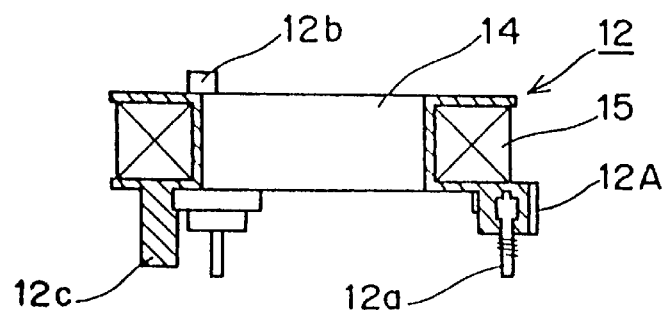
FIG. 16 A vertical sectional view of the coil unit according to a third embodiment of this invention.
Figure 17:
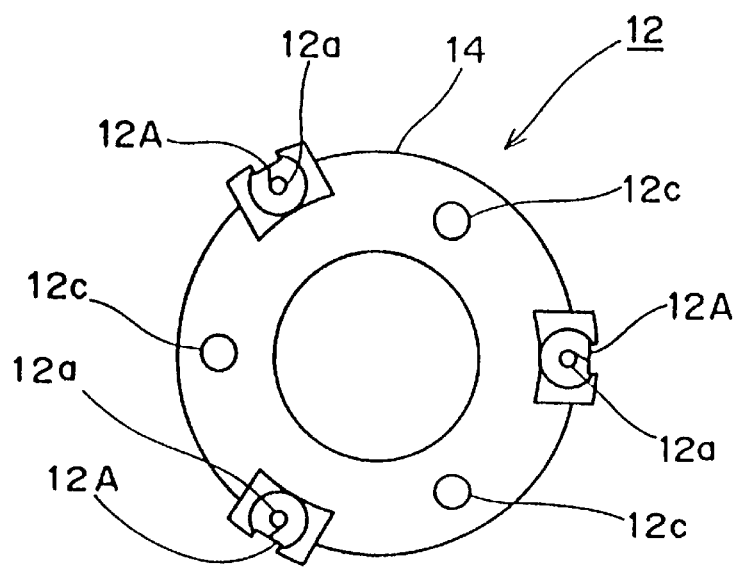
FIG. 17 A back view of the coil unit according to a third embodiment of this invention.

Further, a third embodiment of this invention will be described. FIG. 15 through FIG. 17 show this embodiment.

In FIG. 15 through FIG. 17, the magnetic field winding 15 is wound around the coil bobbin 14, the terminal pins 12a are integrally formed with the coil bobbin 14 on the flange 14a, the terminal pins 12a are disposed at an equal pitch taking a winding efficiency into consideration, and the grooves 12A are disposed to allow easy binding of the leading end of a drawn line on the terminal pins 12a and to prevent the breakage of wire.

Thus, according to the third embodiment, by forming the terminal pins integrally with the coil bobbin using synthetic resin, making a distance between the terminal pins equal, and disposing the guide grooves for the drawn lines, a position can be easily determined when automatizing the size control of press fitting parts and winding work, a yield of winding work can be improved, and the strength of the terminal pins can be enhanced.

Further, according to the above first, second and third embodiments, the stator, the rotor and the circuit unit are separately assembled, and the circuit unit is fitted from the outside of the base plate, so that assembling is easy.

Besides, according to the above first, second and third embodiments, assembling is made better, and the process is controlled easily. Particularly, there is an effect that the stator and the rotor can be assembled without being restricted by the completion of the circuit unit.

Still further, according to the above first, second and third embodiments, a packaging area of the circuit unit is increased to allow the use of inexpensive electronic parts, a degree of freedom for the art work is obtained, the workability in assembling the circuit unit is improved, and the rotor alone can be removed leaving the circuit unit as it is by removing the stopper washer from the center hole.

And furthermore, according to the above first, second and third embodiments, by directly soldering the terminal pins of the coil unit to the circuit unit, a yield is improved as compared with a conventional method in which the drawn line is led around for connecting.

And, according to the above first, second and third embodiments, in case of failure of the circuit unit and the rotor, the replacement, modification or adjustment of the circuit unit and the rotor can be made easily.

Further, according to the above first, second and third embodiments, as the stator section can be made particularly thin as compared with a conventional one, thin-shaped products which meet the market needs can be provided.

Figure 18:
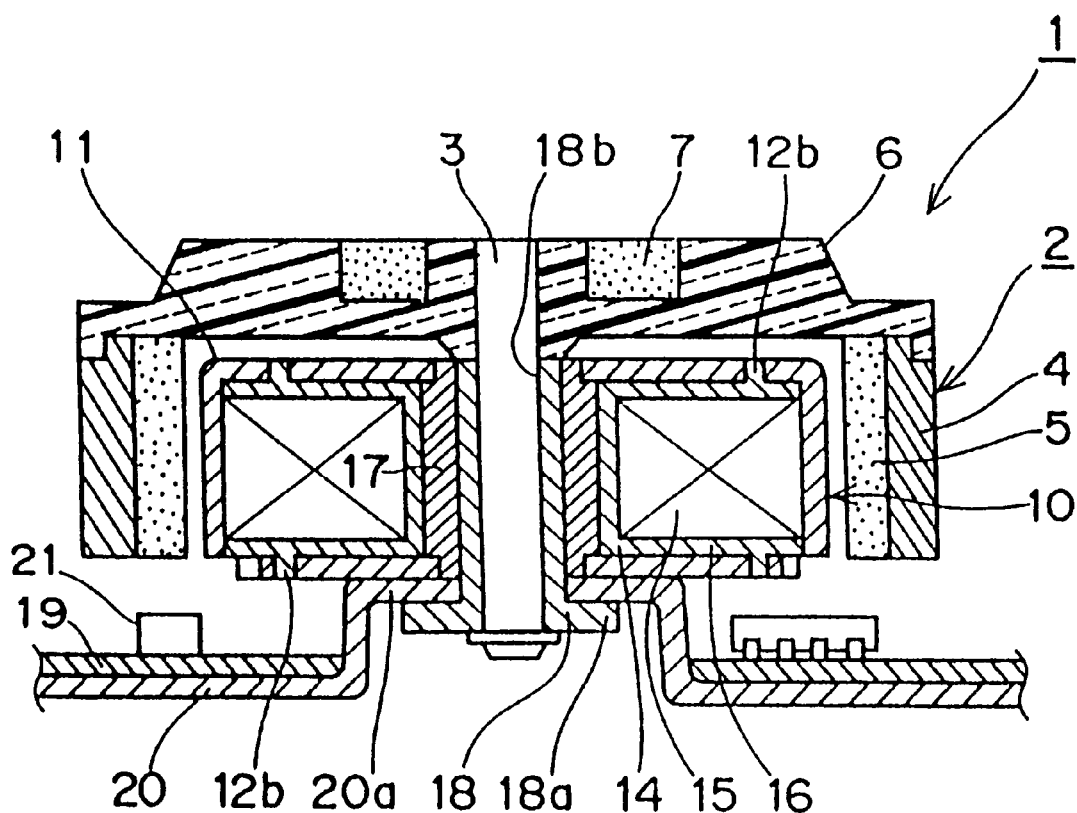
FIG. 18 A vertical sectional view of the brushless DC motor according to a fourth embodiment of this invention.
Figure 19:
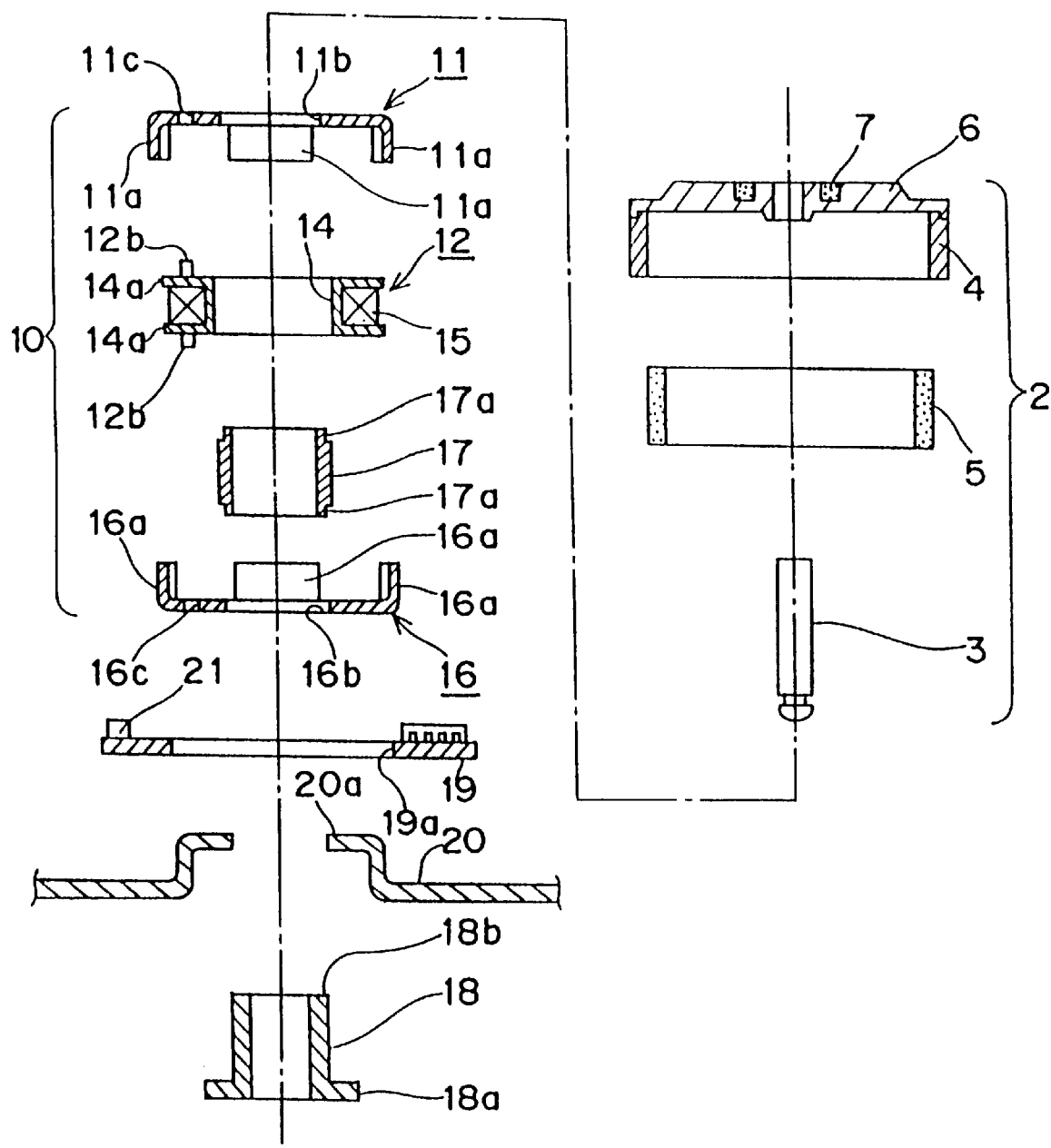
FIG. 19 An exploded perspective view of the brushless DC motor according to a fourth embodiment of this invention.

Now, a fourth embodiment will be described with reference to the drawings. FIG. 18 shows a vertical sectional view of the brushless DC motor of this embodiment, and FIG. 19 shows its exploded sectional view. In FIG. 18 and FIG. 19, 1 represents a brushless DC motor, 2 a rotor, 10 a stator, 19 a circuit unit, 20 a base plate on which the motor 1 is attached.

The rotor 2 is formed in the shape of a cup, has a shaft (revolving shaft) 3 press-fitted at the center, and has a rotor magnet (permanent magnet) 5 adhered to be fixed to the inner periphery of the rotor yoke 4. The rotor magnet 5 is formed in the shape of a ring, and has N and S poles magnetized alternately in the circumferential direction.

And, a turn table 6 made of resin to be put on the outer periphery of the rotor yoke 4 is integrally formed. Therefore, an assembling manhour can be reduced, and the turn table 6 can be kept horizontal.

Figure 23:
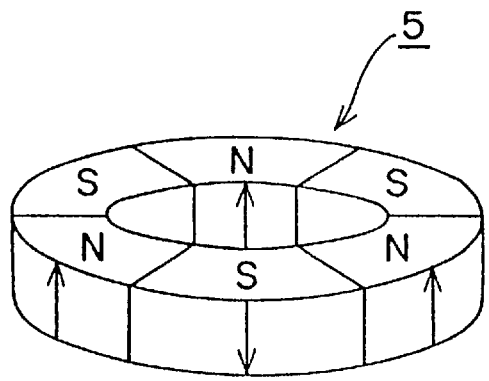
FIG. 23 A perspective view of the chucking magnet according to a fourth embodiment of this invention.
Figure 24:
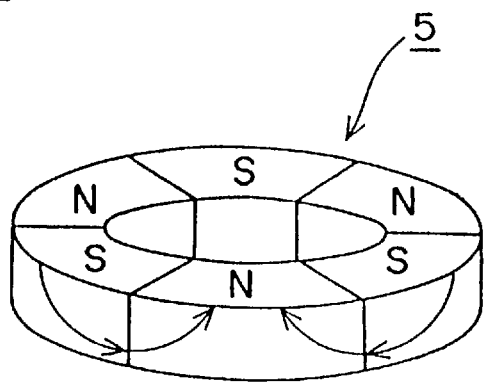
FIG. 24 A perspective view showing another embodiment of the chucking magnet according to a fourth embodiment of this invention.
Figure 36:
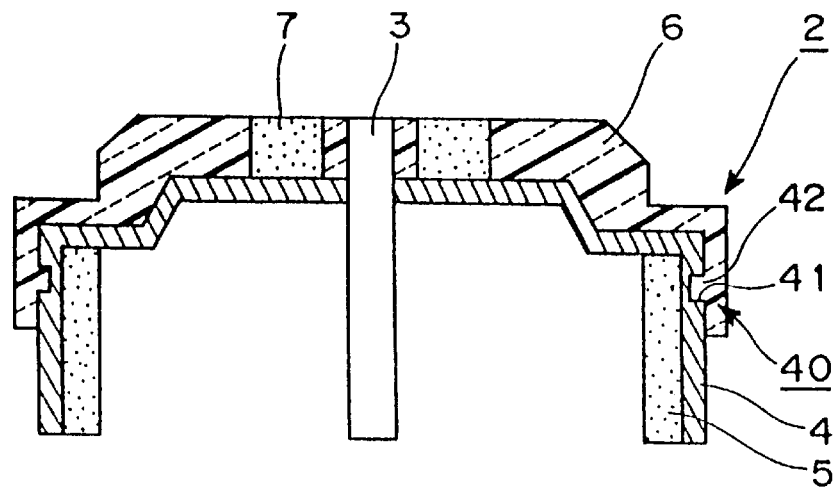
FIG. 36 A vertical sectional view showing the rotor yoke according to a twelfth embodiment of this invention.

Reference numeral 7 represents a chucking magnet (rotor magnet), which is magnetized in many poles as shown in FIG. 23 and FIG. 24. The magnetization direction includes the formation of Ns and Ss as shown in FIG. 23, and the formation of a magnetic circuit at the lower face to flow round as shown in FIG. 24. Therefore, differing from a conventional one which is magnetized to direct magnetic flux in the same direction, a magnetic path is short and leakage flux is small, resulting in the prevention of an adverse effect on the motor and the increase of an adsorption fixing force. When the chucking magnet 7 is disposed in a single number on the turn table 6 as shown in FIG. 19, the one shown in FIG. 24 has less leakage flux, and when the magnet 7 is disposed on the rotor yoke 4 made of a magnetic material as shown in FIG. 36 to be shown afterward, magnetic flux returns through the magnetic material, so that the magnet shown in FIG. 23 has the same effect with the one shown in FIG. 24.

The above stator 10 comprises an upper first stator yoke 11 in the figure, a coil unit 12, and a bearing 18 to rotatably support a lower second stator yoke 16, a sleeve 17 and the shaft 3.

Figure 20:
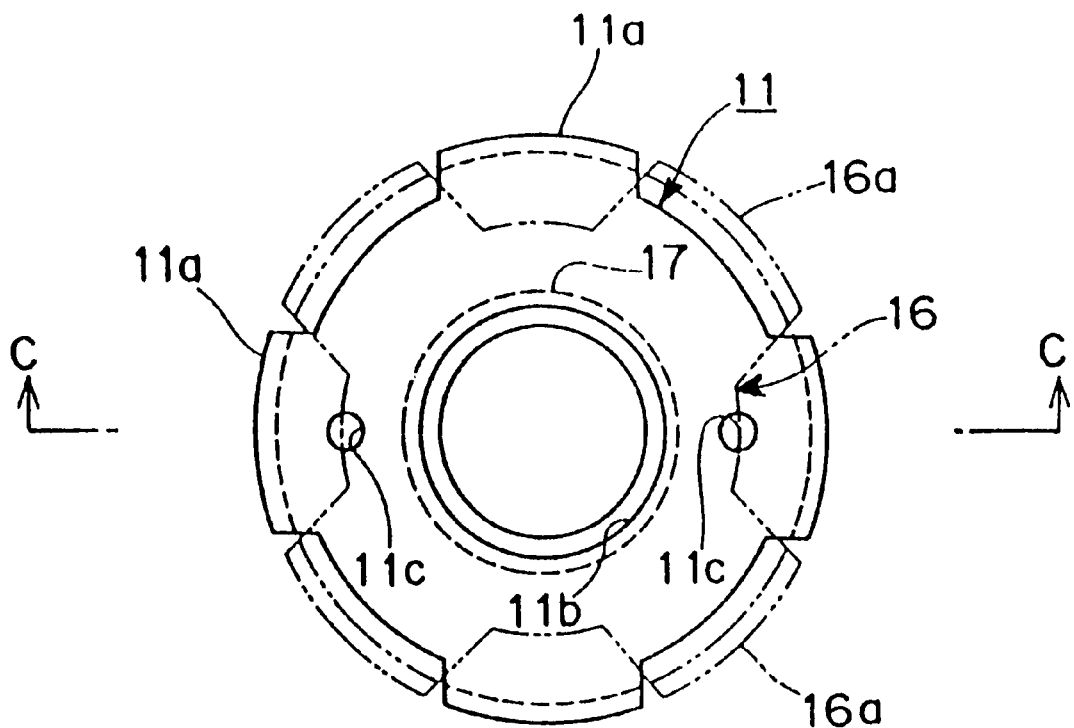
FIG. 20 A plan view of the stator yoke according to a fourth embodiment of this invention.
Figure 21:
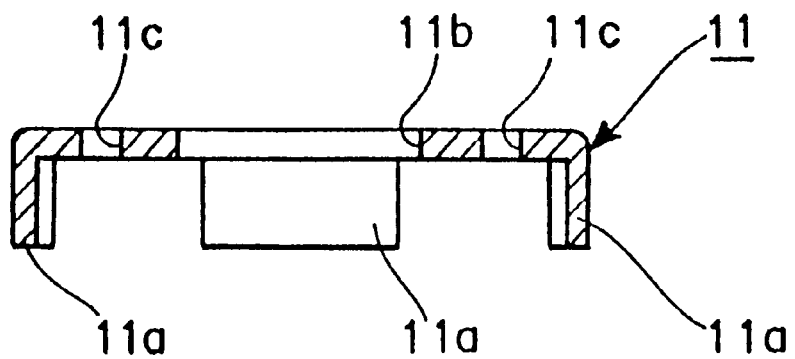
FIG. 21 An exploded sectional view of the stator according to a fourth embodiment of this invention.

The first and second stator yokes 11, 16 are made of a soft magnetic metal plate, which is punched out into a prescribed shape, and radially extending parts are bent at right angles to form a magnetic pole 11a or 16a as shown in FIG. 20 and FIG. 21. In this embodiment, as the motor 1 has 8 poles, the stator yokes 11, 16 each have four magnetic poles 11a, 16a respectively at certain intervals in the circumferential direction. And, the stator yokes 11, 16 are put together with the magnetic poles 11a, 16a faced mutually in the circumferential direction with the sleeve 17 made of a soft magnetic material disposed therebetween as shown in FIG. 20 to form a magnetic circuit.

Figure 22:
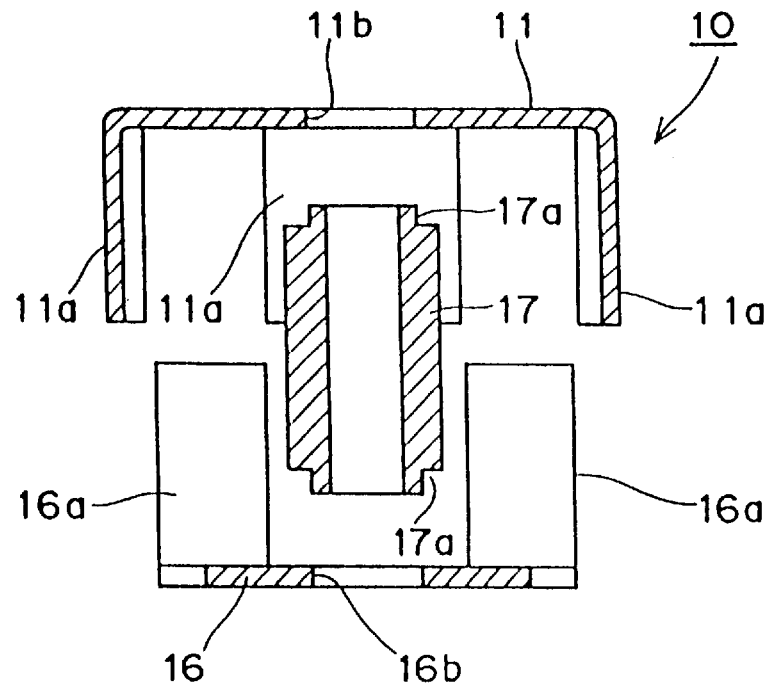
FIG. 22 A sectional view taken along line C—C of FIG. 20 according to a fourth embodiment of this invention.

The above coil unit 12 comprises a coil bobbin 14 made of resin having a flange 14a on either end, and a magnetic field coil 15 wound on it. And, the above sleeve 17 is formed in the shape of a cylinder, has a fitting part 17a shaped to protrude formed on either end, and fitted in fitting holes 11b and 16b formed at the center of the stator yokes 11, 16 as shown in FIG. 22. Further, pins 12b are protruded from both flanges 14a of the bobbin 14, holes 11c, 16c for fitting with these pins 12b are respectively formed in the stator yokes 11, 16, and when the first and second stator yokes 11, 16 are assembled with the coil unit 12, relative positioning in the circumferential direction is made with the stator yokes 11, 16.

As to the relative positioning of the stator yokes 11, 16, instead of disposing the aforementioned pins 12b and fitting holes 11c, 16c, the fitting parts 17a of the sleeve 17 and the inserting holes 11b, 16b of the stator yokes 11, 16 to be inserted therein may have their flat shapes formed to be polygonal or non-circular, so that assembling and relative positioning in the circumferential direction can be made simultaneously.

And, after assembling the first stator yoke 11, coil unit 12, sleeve 17 and second stator yoke 16 into the stator 10, a fitting hole 19a of a circuit unit 19 is fitted to a fitting projection 20a formed to protrude at the center of a base plate 20, and the bearing 18 is fitted from below the fitting projection 20a to assemble the entire motor. The bearing 18 has a flange 18a formed at the bottom end, which is larger than the hole of the fitting projection 20a of the base plate 20, inserted upward into the sleeve 17 of the stator 10 assembled, and the first stator yoke 11 and the second stator yoke 12 are fixed with the sleeve 17 by caulking to enlarge a top opening 18b with a jig. The first stator yoke 11 and the second stator yoke 12 may be fixed to the sleeve 17 by press fitting, or the bearing 18 may be fixed in the sleeve 17 by press fitting. In the figure, 21 represents a magnetic pole detecting element for detecting a magnetic pole position of the rotor.

The circuit unit 19 disposed on the base plate 20 is fixed by adhering or screwing into holes previously formed in the circuit unit 19 and the base plate 20 so that the magnetic pole sensing element (hall element) 21 disposed on the circuit unit 19 is positioned at a prescribed place.

Therefore, when the inserting parts disposed at the end of the sleeve and the inserting holes of the stator yokes are formed to be non-circular in this embodiment, the stator can be assembled by simply fitting the inserting parts into the inserting holes, so that positioning of the stator yokes is possible and assembling is easy. Further, it is not necessary to dispose a ring section on each stator yoke like a conventional motor, a winding volume of the bobbin in a radial direction can be increased, and it is particularly suitable to miniaturize the motor.

As the base plate can be assembled by sandwiching the fitting projection of the base plate between the flange of the bearing and the stator, it is not necessary to form tapped holes to screw the stator and the base plate like a conventional motor, simplifying the structure and assembling.

Further, as the base plate is assembled by press fitting the bearing to the fitting projection and the fitting projection formed to have a flat face is sandwiched by the flange of the bearing, vertical accuracy of the bearing can be secured. Besides, as the fitting projection of the base plate is used for fitting, a space can be provided between the coil section and the base plate to attach the circuit unit and the magnetic pole sensing element.

As this embodiment integrally forms the rotor and the turn table, the number of parts and assembling manhour are reduced. Further, a drawback that the turn table is tilted when assembled seen in a conventional motor is remedied, and horizontal accuracy of the turn table can be secured, thus improving workability in mass-production, and reducing costs to a large extent.

Figure 25:
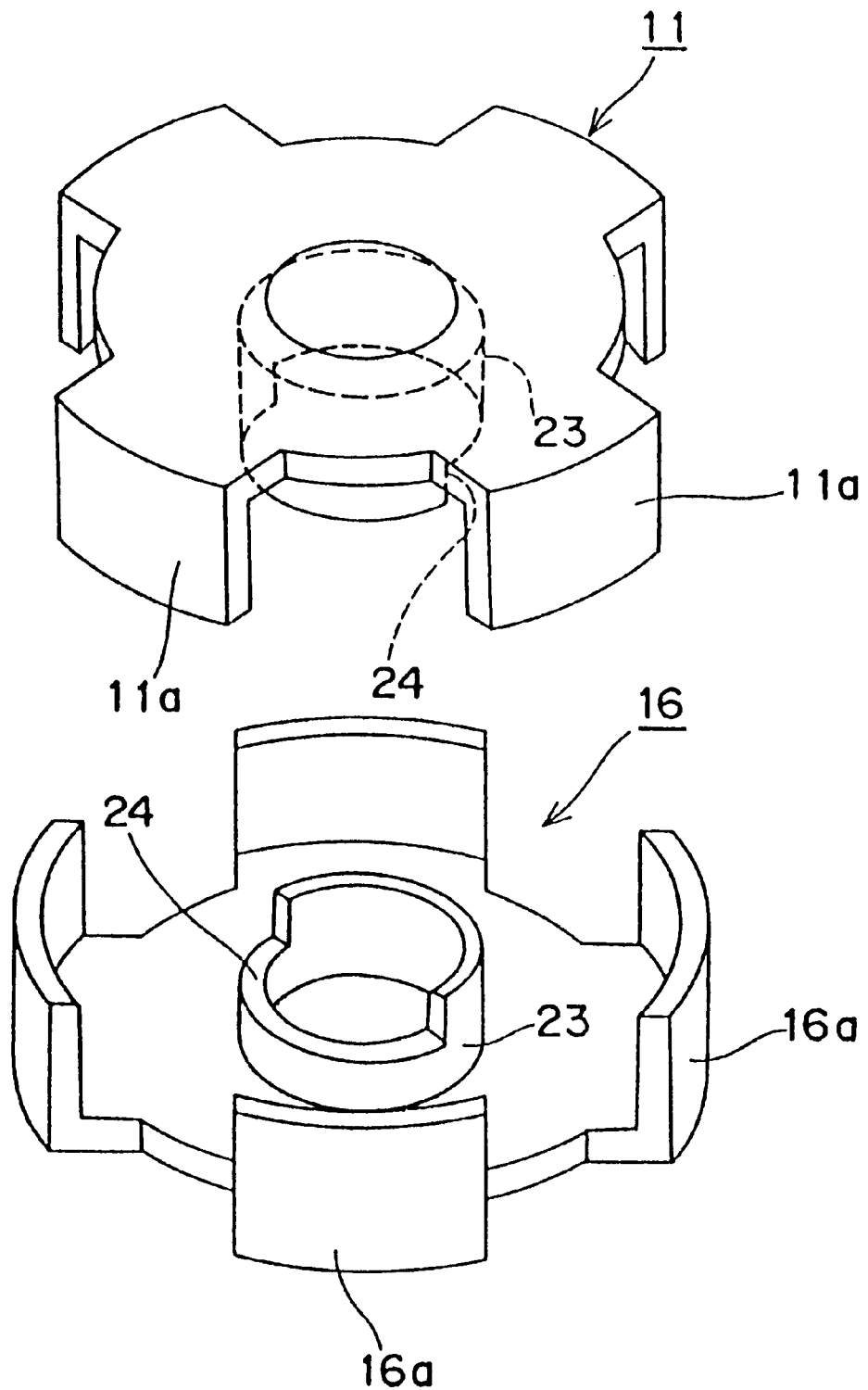
FIG. 25 A perspective view of the first and second stator yokes according to a fifth embodiment of this invention.

Now, a fifth embodiment of this invention will be described. In this embodiment, the stator yokes 11, 16 have a sleeve (cylindrical section) 23 integrally formed, have a cutout section 24 formed by cutting (D cut) halfway round the leading end of each sleeve 23, and can be fitted mutually as shown in FIG. 25. Both the sleeves 23 are formed to a length approximately half of the length in the axial direction when both the stator yokes 11, 16 are put together, and the direction of each cutout section 24 is appropriately set, so that a relative positioning of the stator yokes 11, 16 in the circumferential direction can be made. And, when the position of both the cutout sections 24 is properly selected, stator yokes prepared in the same shape can be used as the stator yokes 11, 16.

Figure 26:
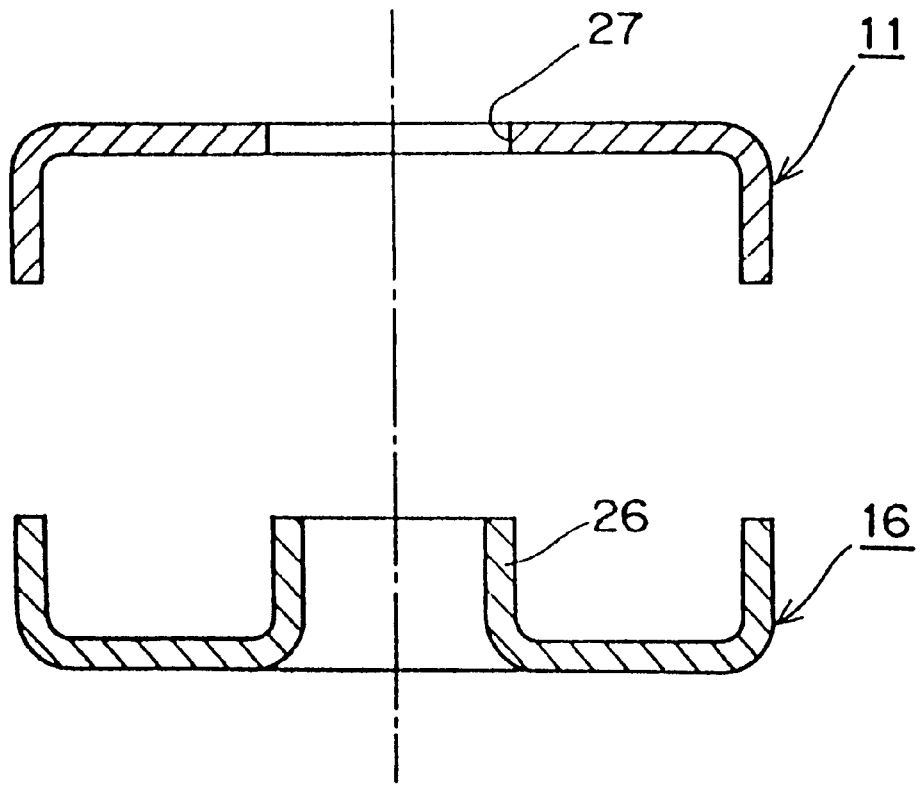
FIG. 26 An exploded sectional view of the stator yoke according to a sixth embodiment of this invention.
Figure 27:
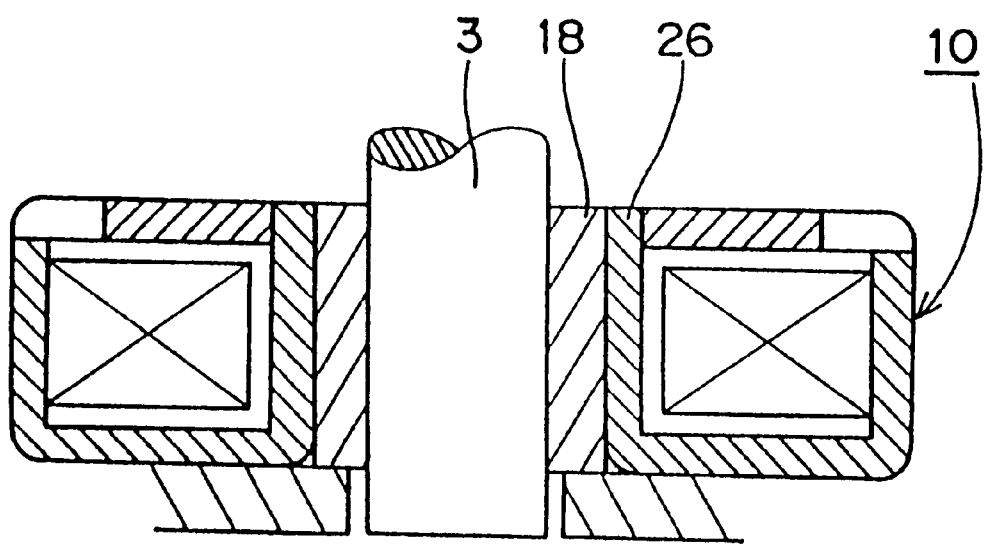
FIG. 27 A vertical sectional view of the essential part of the brushless DC motor according to a sixth embodiment of this invention.

Then, a sixth embodiment of this invention will be described. In this embodiment, a sleeve 26 is integrally formed with one stator yoke 16 forming the stator 10, and a fitting hole 27 for fitting the leading end of the sleeve 26 therein is formed at the center of the other stator yoke 11 as shown in FIG. 26. And, in the sleeve 26 of both the stator yokes 11, 16 fitted together with the coil unit 12 therebetween, the bearing 18 is directly fitted by press fitting or caulking as shown in FIG. 27.

Therefore, this embodiment does not need the cylindrical part of one of the stator yokes like a conventional motor, is superior in the productivity of the stator yokes, can secure an exclusive volume for the winding of the coil unit, reduces the number of parts, and simplifies assembling work.

Figure 28:
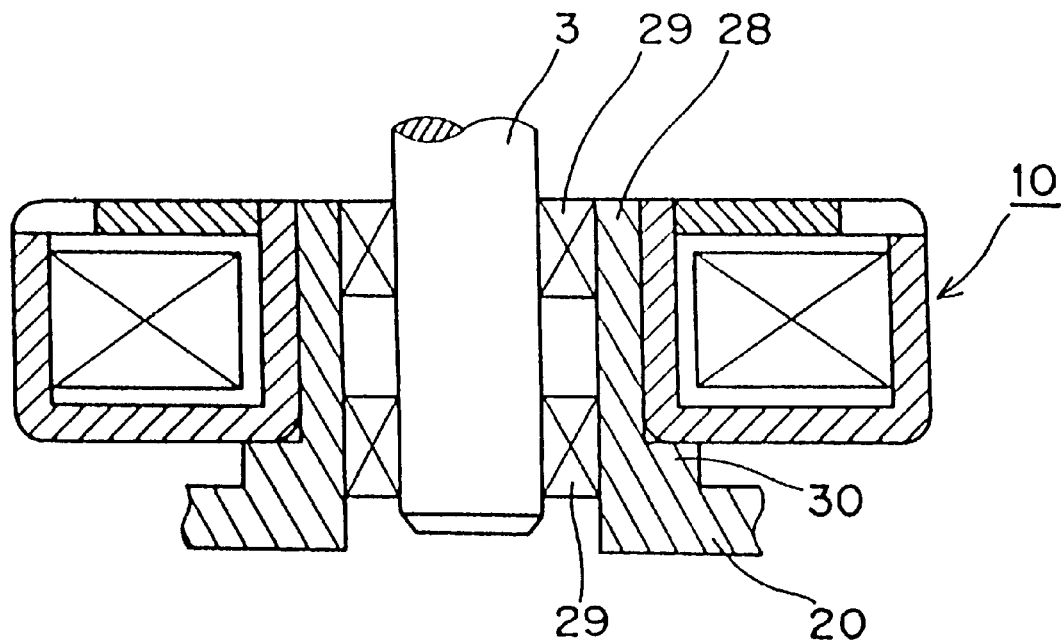
FIG. 28 A vertical sectional view of the essential part of the brushless DC motor according to a seventh embodiment of this invention.

Next, a seventh embodiment of this invention will be described. In this embodiment, a sleeve 28 is integrally formed with the base plate 20 supporting the motor 1, and a bearing 29 is disposed within the sleeve 28 as shown in FIG. 28. And, a step section 30 supporting the stator 10 is formed at the lower part of the sleeve 28 in the figure to secure a space between the stator 10 and the base plate 20, so that the circuit unit 19 and the magnetic pole sensing element 21 can be disposed.

Therefore, this embodiment reduces the number of parts, reduces an assembling manhour, secures the space for the circuit board, and surely obtains vertical accuracy of the bearing.

Figure 29:
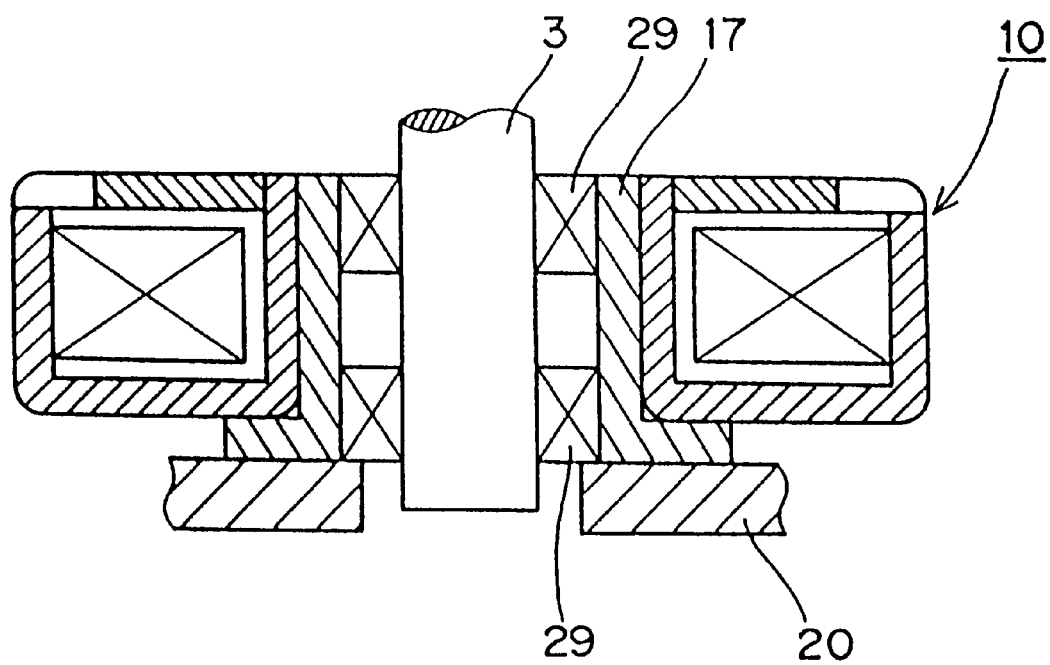
FIG. 29 A vertical sectional view of the essential part of the brushless DC motor according to an eighth embodiment of this invention.

Further, an eighth embodiment of this invention will be described. In this embodiment, the sleeve 17 which supports the bearing 29 and is attached to the inside of the stator 10 is made of a material having a high magnetic permeability as shown in FIG. 29.

Therefore, as an auxiliary magnetic circuit is formed on the inside of the stator, the magnetic circuit had a reduced area on the inside and magnetic saturation was easily caused when magnetic flux on the coil unit side was made powerful in the past, but as the auxiliary magnetic circuit is formed in this embodiment, powerful magnetic poles can be obtained without generating magnetic saturation.

Figure 30:
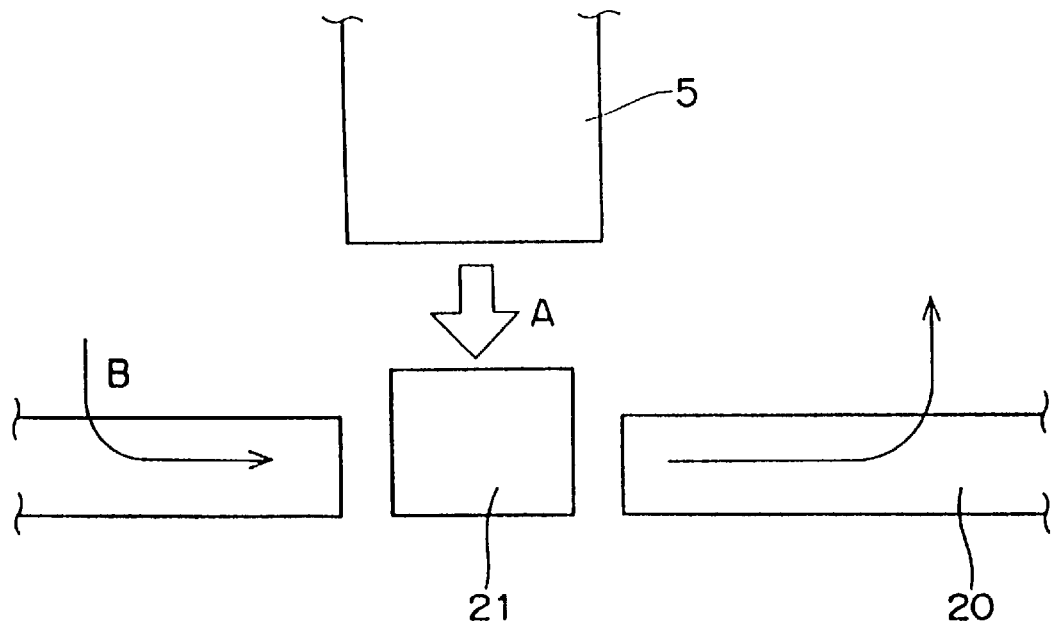
FIG. 30 An explanatory view for describing the relation between the magnetic pole sensing element and the magnetic flux according to a ninth embodiment of this invention.

Besides, a ninth embodiment of this invention will be described. This embodiment has a structure to prevent adverse effects on the magnetic pole sensing element by means of the rotor magnet. Specifically, the magnetic pole sensing element 21 is positioned at a place to nearly face the rotor magnet 5 as shown in FIG. 30, and operated by magnetic flux A in the direction approximately 90 degrees from the rotor magnet 5. However, when the supporting member 20 such as the base plate to which the magnetic pole sensing element 21 is attached is a magnetic material, the leakage flux of the rotor magnet acts via the supporting member 20 as magnetic flux (arrow B in the figure) parallel to the magnetic pole sensing element, possibly causing the magnetic pole detecting element to malfunction.

Figure 31:
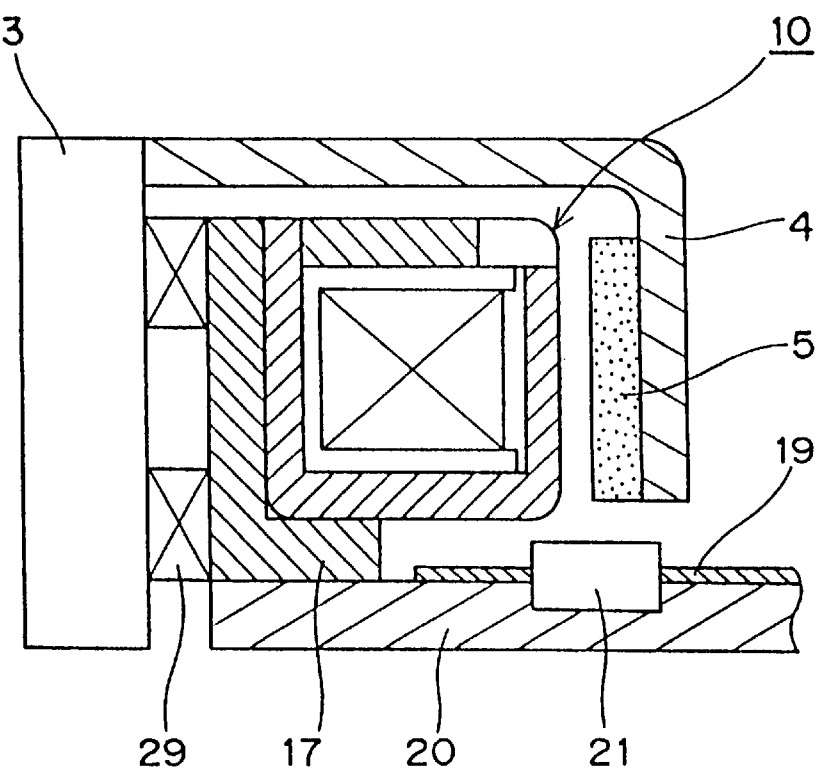
FIG. 31 A vertical sectional view of the essential part of the brushless DC motor according to a ninth embodiment of this invention.

Therefore, when assembling is made as shown in FIG. 31 in this embodiment, the supporting member 20 in the vicinity of the magnetic pole sensing element supporting the magnetic pole sensing element 21 is made of a non-magnetic material such as aluminum, brass, non-magnetic stainless steel, resin or ceramics. Thus, malfunction can be surely prevented even when the magnetic pole sensing element is disposed by, for example, embedding in the supporting member.

Further, a tenth embodiment of this invention will be described. In this embodiment, the magnetic pole detecting element 21 to be disposed on the circuit unit 19 can be easily positioned at a prescribed position to face the rotor magnet 5 as shown in FIG. 32.

Figure 32:
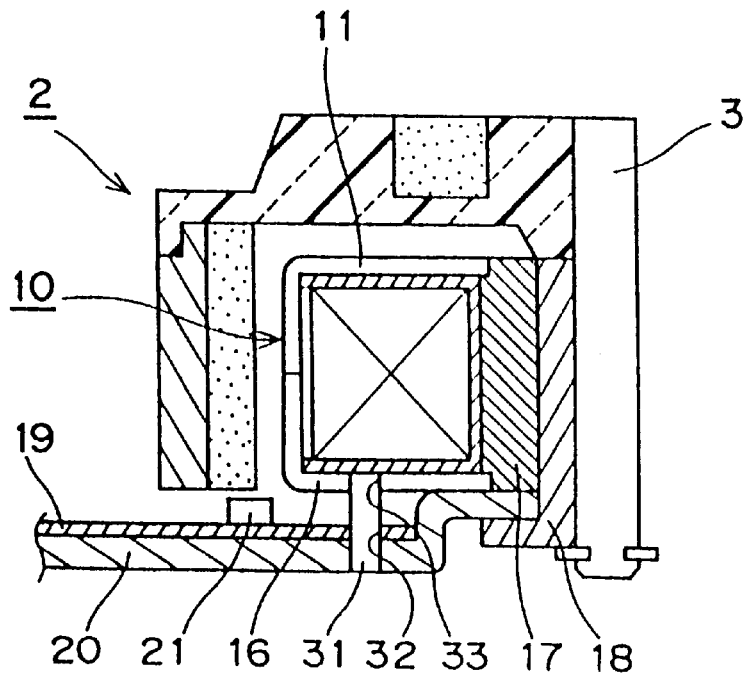
FIG. 32 A vertical sectional view of the essential part of the brushless DC motor according to a tenth embodiment of this invention.

Specifically, as shown in FIG. 32, a positioning pin 31 is protruded on the base plate 20, positioning holes 32, 33 are formed in the circuit unit 19 and one stator yoke 16 of the stator 10, and the holes 32 and 33 are successively fitted to the positioning pin 31 when assembling, so that the stator 10 and the magnetic pole sensing element 21 can be positioned easily.

As to the positioning pin and the holes to be fitted therewith, the positioning pin may be protruded on the stator and the circuit unit, and the holes may be formed in another member. The positioning pin may be made of metal and driven in, be integrally formed of resin, or be removed after assembling.

Now, an eleventh embodiment of this invention will be described. This embodiment prevents that a drawn line 15a of the magnetic field coil 15 of the coil unit 12 attached to the stator 10 is floated up due to the revolution of the rotor 2 and contacted to the bottom end of the rotor 2.

Figure 33:
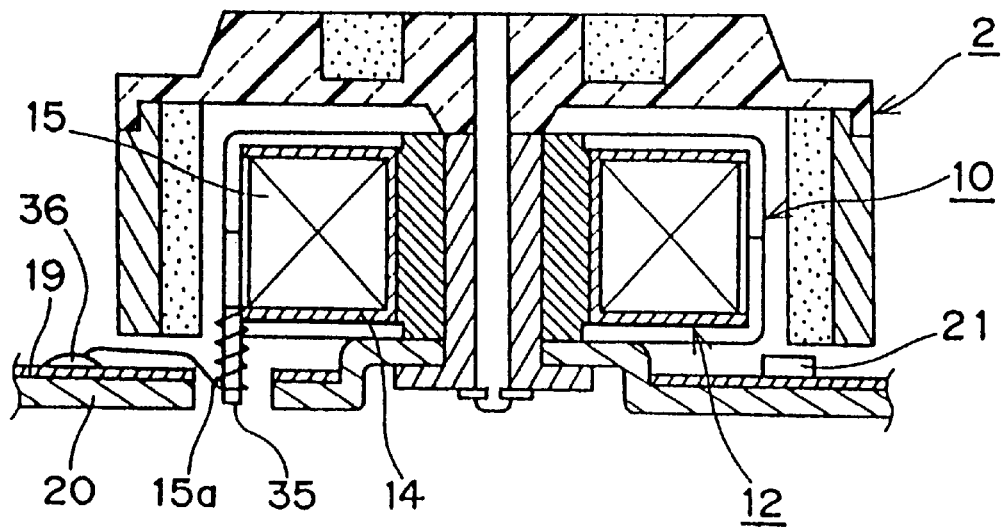
FIG. 33 A vertical sectional view of the brushless DC motor according to an eleventh embodiment of this invention.
Figure 34:
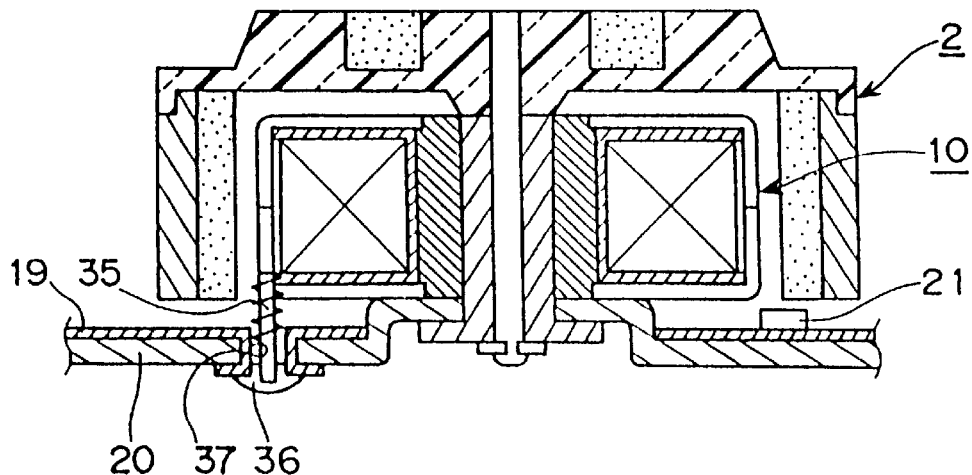
FIG. 34 A vertical sectional view showing another embodiment of the drawn line supporting structure according to an eleventh embodiment of this invention.
Figure 35:
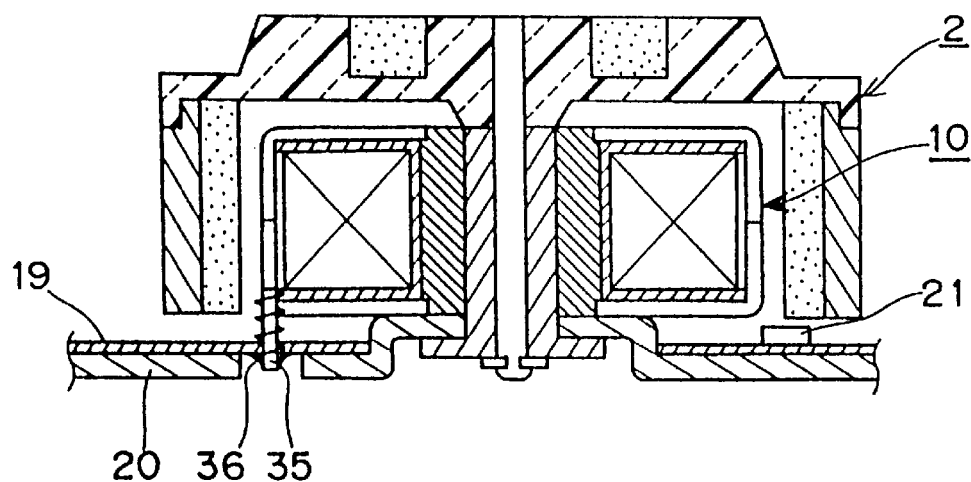
FIG. 35 A vertical sectional view showing another embodiment of the drawn line supporting structure according to an eleventh embodiment of this invention.

Therefore, in this embodiment, a pin 35 is protruded downward near a drawn part of the magnetic field coil 15 at the lower part of the bobbin 14, the drawn line 15a is twined around the pin 35 and fixed to the circuit unit 19 on the base plate 20 by solder 36 as shown in FIG. 33. And, as shown in FIG. 34, a through hole 37 may be formed in the base plate to fix on the bottom face of the base plate by the solder 36. Further, as shown in FIG. 35, fixing can be made on the back face of the circuit unit 19 using the solder 36.

Therefore, in this embodiment, as the end of the magnetic field coil is fixed to the circuit unit in a state tied to the terminal pins which are protruded from the bobbin, it is prevented from being contacted to the rotor when being lead around to the position away from the rotor. Specifically, it can be lead in from below in view of an angle as shown in the figure. Further, after fixing, when the loosened end is pulled into the hole which is formed in the base plate, floating of the end is eliminated, so that there are advantages that its contact can be prevented, and workability can be improved.

Then, a twelfth embodiment of this invention will be described. In this embodiment, the turn table 6 is put on the outer surface of the rotor yoke 4 of the rotor 2 as shown in FIG. 36. The turn table 6 is made of resin or metal material, and has the chucking magnet 7 for adhesion and fixing disposed on the top surface. And, a fitting structure 40 is disposed between the rotor yoke 4 and the turn table 6. This fitting structure 40 has a structure that a fitting recess 41 in the shape of a groove is formed in the circumferential direction on the outer periphery of the rotor yoke 4, and a fitting projection 42, which is fitted in the circumferential direction with the fitting recess 41, is formed on the inner periphery of the turn table 6.

Therefore, as this embodiment provides the fitting structure between the rotor yoke and the turn table, when the turn table made of resin is integrally formed with the rotor yoke, resin is prevented from floating up from the rotor yoke. As the above fitting structure, a groove or a hole, and a projection which can be fitted therewith may be formed on either member.

Although this invention has been described using the above embodiments, it is to be understood that this invention is not limited to the above embodiments and covers all embodiments for attaining the object of this invention.

As described above, according to the fourth through twelfth embodiments, the fitting projection of the base plate is sandwiched between the flange of the bearing and the stator to attach the base plate, so that it does not need to dispose a tapped hole and to screw like a conventional one, simplifying the structure and the assembling work.

Further, to assemble the base plate, the fitting projection formed to have the flat face is sandwiched by the flange of the bearing by press fitting the bearing to the fitting projection, so that vertical accuracy of the bearing can be secured. Besides, as the fitting projection of the base plate is used for fitting, the space can be provided between the coil and the base plate to dispose the circuit board and the magnetic pole sensing element. And, the number of assembling parts can be reduced, assembling is simple, an assembling manhour is reduced, and the motor performance can be improved.

Now, a thirteenth embodiment of this invention will be described. This embodiment will describe a case applied to a four-pole outer rotor brushless DC motor 1 shown in FIG. 37.

A rotor 2 of this embodiment has a rotor magnet 5, which is magnetized in four poles, adhered in the cylindrical shape and in the circumferential direction to the inner wall of a cup shaped rotor yoke 4, and has a shaft 11 press-fitted at the center as shown in FIG. 37. The rotor magnet 5 may be a combination of a plurality of segments, or sheet-shaped magnets rolled up and magnetized in many poles.

As shown in FIG. 38, a first stator yoke 11 and a second stator yoke 16 are disposed to face the poles of the rotor magnet 5. The first stator yoke 11 is made of a soft magnetic metal plate, which is punched out into a desired shape, and bent to form magnetic poles 11a, and a ring 23 is integrally shaped at the center by drawing. The second stator yoke 16 is also shaped in the same way to form magnetic poles 16a and a ring 17, and a bearing 18 is inserted in the ring 17. The magnetic poles each of the first stator yoke 11 and the second stator yoke 16 have two poles which are a half of the magnet pole number, and are combined to oppose mutual magnetic poles 11a and 16a. The first stator yoke 11 and the second stator yoke 16 have the same shape, and their directions and angles are changed when combined. Between the first stator yoke 11 and the second stator yoke 16, a coil unit 12 for excitation is sandwiched and a stator 10 is formed by the first and second stator yokes 11, 16 and the coil unit 12. Under the second stator yoke 16, a position sensing element (hereinafter referred to as the hall element) 21 which is a sensor for detecting a pole of the rotor magnet 5, and the hall element 21 is attached to a circuit unit 19 having a driving circuit element for the motor 1.

Figure 41:
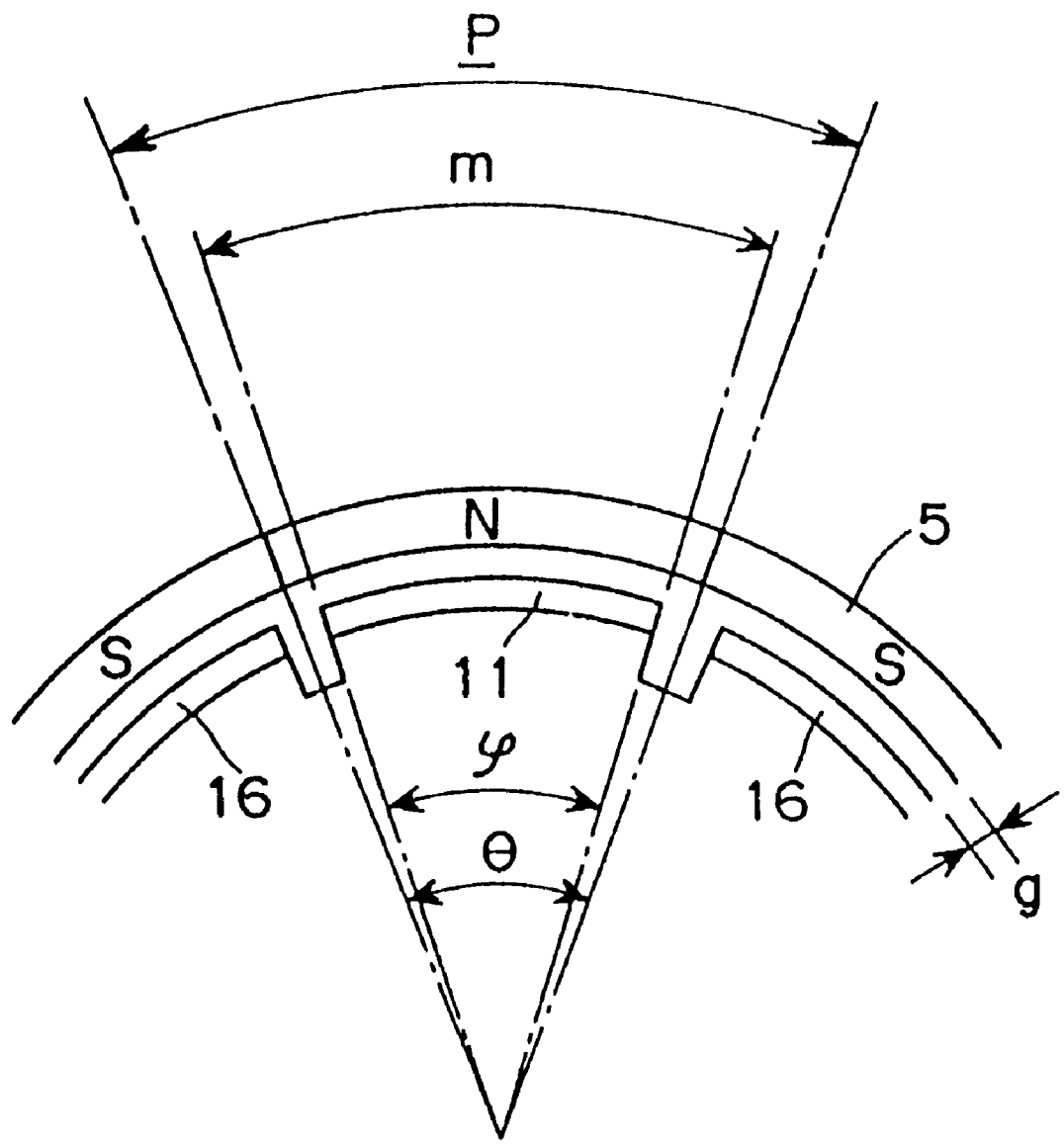
FIG. 41 An expanded plan view of the essential part describing the open angle according to a thirteenth embodiment of this invention.

And, in this embodiment, an open angle $\phi$ of each magnetic pole 11a, 16a is formed to a magnitude falling in a rage of 75% or more and less than 100% with respect to an open angle $\theta$ for each pole as shown in FIG. 41. In other words, to an open angle $\theta$ of each pole of the rotor magnet 5 when the circumferential direction is viewed from the revolving center of the rotor 2, an open angle $\phi$ of each magnetic pole 11a, 16a of the stator 10 is determined to be 75% or more and less than 100%.

Figure 39:
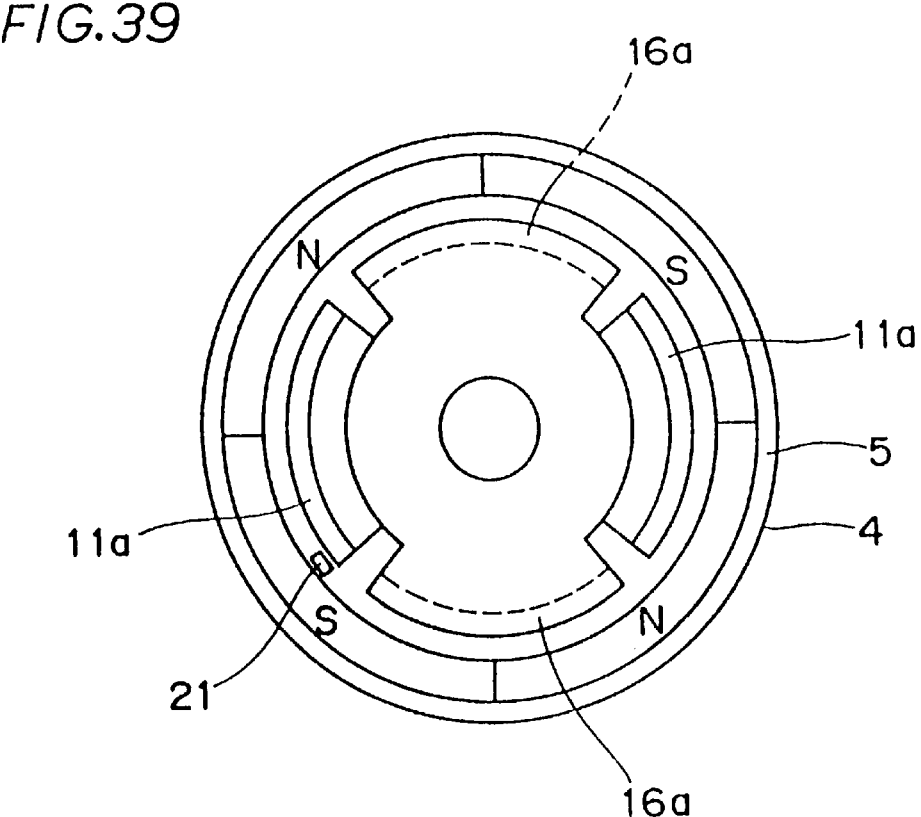
FIG. 39 A schematic plan view describing the action of the brushless DC motor according to a thirteenth embodiment of this invention.
Figure 40:
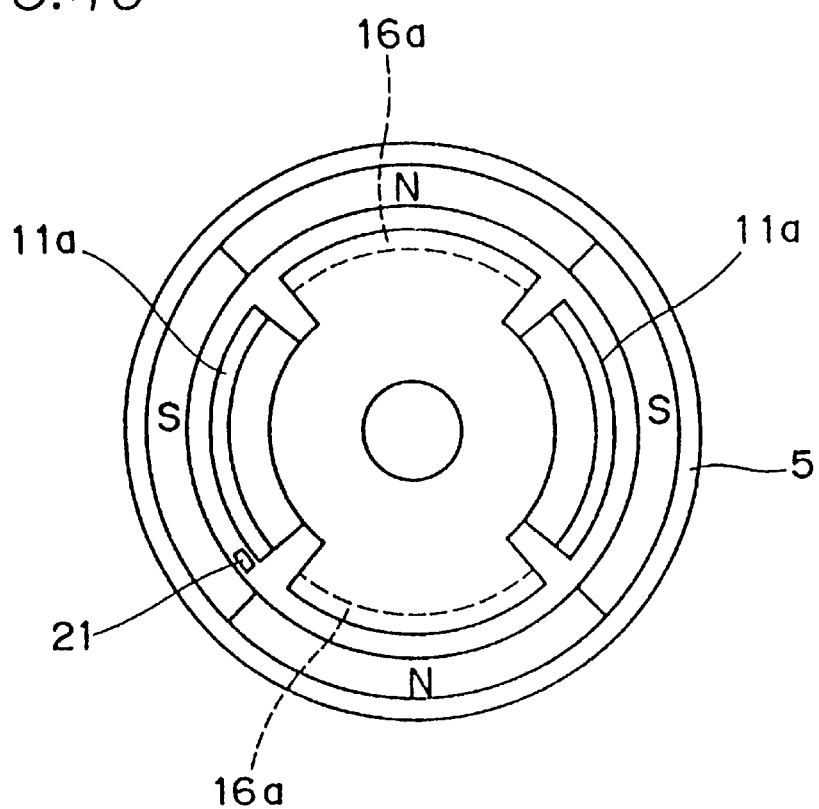
FIG. 40 A schematic plan view describing the action of the brushless DC motor according to a thirteenth embodiment of this invention.

The reasons for determining as described above will be described with reference to FIG. 39 through FIG. 42. FIG. 39 and FIG. 40 are schematic plan views describing the principle of operation of the motor, FIG. 41 is an expanded plan view of the essential part describing an open angle, and FIG. 42 includes explanatory views of cogging torques of the motor.

Generally, the relation between the rotor magnet 5 and each magnetic pole 11a, 16a of the stator in the brushless DC motor is as follows. Specifically, the rotor magnet 5 in the shape of a ring is attached to the inner periphery of the rotor yoke 4, and the rotor magnet 5 has the segment of each pole magnetized in a radial direction at an equal pitch in the circumferential direction as shown in FIG. 39 and FIG. 40. And, the magnetic poles 11a, 16a of the first and second stator yokes 11, 16 are alternately disposed to oppose the rotor magnet 5. Each magnetic pole 11a, 16a has the shape of a rectangle or trapezoid, and is symmetrical in the pre-revolution direction and the post-revolution direction.

A cogging torque is produced according to a magnetic circuit consisting of the rotor magnet 5 and the stator yokes 11, 16, and the torque becomes zero at intervals of 90 degrees in electric angle. But, the point of torque zero includes an unstable point at which the rotor cannot stand still, and a stable point at which the rotor stably stands still. The unstable and stable points exist alternately.

This relation will be described in further detail. When a boundary of the poles of the rotor magnet 5 is positioned at the center of the magnetic poles 11a, 16a as shown in FIG. 39, and when the center of the magnetic poles 11a, 16a is aligned with the center of the poles of the rotor magnet 5 as shown in FIG. 40, the cogging torque is at the position of zero. On the other hand, the positional relation between the magnetic poles 11a, 16a and the rotor magnet 5 that a maximum torque can be obtained by passing an electric current through the winding 15 is where a boundary of the poles of the rotor magnet 5 is positioned at the center of the magnetic poles 11a, 16a as shown in FIG. 39. When the stable point is designed to come to this position, a starting torque larger than that at the start of passing an electric current is obtained. Therefore, the motor 1 can be self-started without a dead point by making a stable point in the positional relation of the rotor magnet and the magnetic poles as shown in FIG. 39, so that the provision of such conditions is desired. When the width of magnetic poles 11a, 16a in the circumferential direction is changed, the positions of the unstable and stable points are changed, causing the position of the rotor magnet to be changed with respect to the magnetic poles. More specifically, when the width m of each magnetic pole 11a, 16a in the circumferential direction is changed with respect to the length P of one pole of the rotor magnet 5 in the circumferential direction as shown in FIG. 41, the positions of the unstable and stable points can be changed, so that it is structurally possible that the stable point is set at the aforementioned maximum excitation torque position. This embodiment has been structured in view of the above.

Further, description will be made in view of the electrical characteristics of the motor with reference to FIG. 42.

Figure 42A:
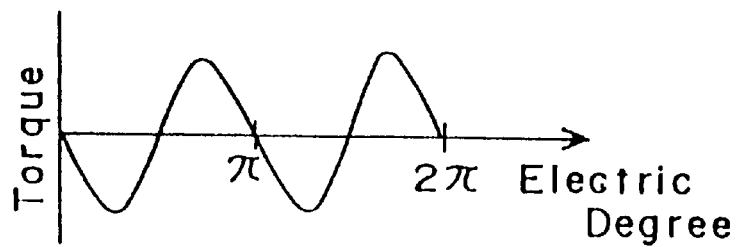
FIGS. 42a–d Characteristic views showing the relation between the electric angle and the cogging torque according to a thirteenth embodiment of this invention.
Figure 42B:
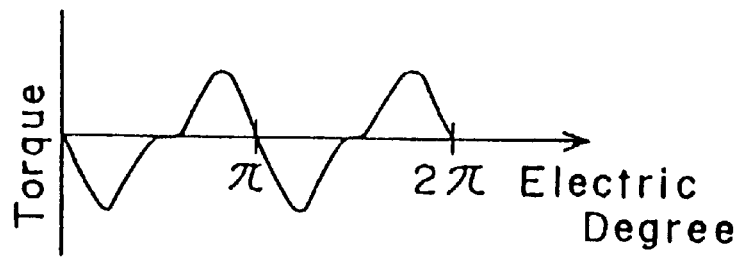
Figure 42C:
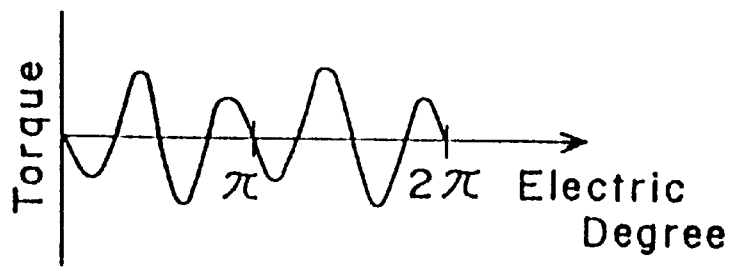
Figure 42D:
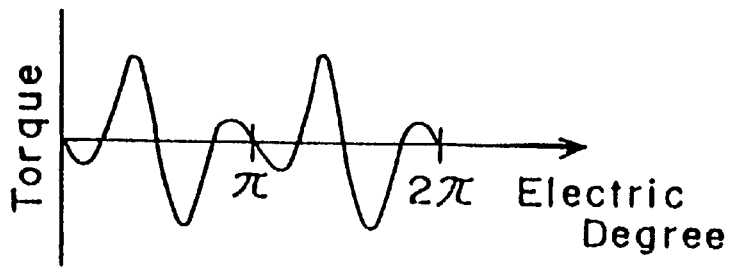

FIGS. 42(a) through (d) are views describing cogging torques of the brushless DC motor 1, and the horizontal line denotes an electric angle and the vertical line a torque (relative value). FIG. 42(a) shows a cogging torque when the ratio m/P of a width (hereinafter referred to as the magnetic pole width m) of the magnetic poles 11a, 16a of the stator 10 in the circumferential direction to a circumferential length per pole of the rotor magnet 5 (hereinafter referred to the length per pole P) is 85%. Similarly, FIG. 42(b) shows a cogging torque when the ratio is 80%, FIG. 42(c) shows a cogging torque when the ratio is 75%, and FIG. 42(d) shows a cogging torque when the ratio is 70%. As seen from the above figures, the stable points of the motor are 0 degree, 180 degrees ($\pi$) and 360 degrees ($2\pi$) and the unstable points are 90 degrees ($\pi/2$) and 270 degrees ($3\pi/2$). The stable points are when a boundary of the poles of the rotor magnet 5 is positioned at the center of each magnetic pole 11a, 16a as shown in FIG. 39, and the unstable points appear when the center of each magnetic pole 11a, 16a is aligned with the center of each pole of the rotor magnet 5 as shown in FIG. 40. A cogging torque when a magnetic pole width m is 80% has the shape similar to a sign wave, but the shape is disarranged as the magnetic pole width m becomes narrower, and when the magnetic pole width m is 75% or below, a torque 0 appears in the proximity of 45 degrees in an electric angle as if the frequency is doubled. But, it was confirmed by experiments that these torque 0 points in the proximity of 45 degrees are unstable points. But, when the magnetic pole width m is 70%, a stable point appears at intervals of 90 degrees in electric angle.

In other words, a stable point appears in either case of the positional relation of FIG. 39 or FIG. 40, and always in the state of FIG. 39, stability lacks in reliability. Furthermore, when the magnetic pole width m is less than 70%, the state of FIG. 40 is a stable point, and that of FIG. 39 is an unstable point, so that it is not desirable because self-starting of the motor can not be made. On the other hand, when the magnetic pole width m is about 100%, magnetic leakage through the adjoining magnetic poles increases, and the magnetic poles are knocked against one another depending on an assembling error, but it is possible to apply to a range close to 100% where the neighboring magnetic poles do not interfere to each other.

The above description has been made based on the circumferential length P on one pole side of the rotor magnet 5 and the magnetic pole width m of the stator, but a magnetic pole width is determined based on a ratio m/P of the lengths in both circumferential directions, a correct value may not be obtained depending on the magnitude of an air gap g between the rotor magnet 5 and the magnetic poles 11a, 16a. Therefore, correct setting can be made when a circumferential angle at the revolving center of the motor 1 is used to express as shown in FIG. 41. More specifically, when an open angle per pole of the rotor magnet 5 is $\theta$ and an open angle of the magnetic poles 11a, 16a is $\phi$ as shown in FIG. 41, a correct magnetic pole width can be obtained by expressing in $\phi/\theta \times 100$ (%).

Accordingly, this embodiment sets a magnetic pole width based on both open angles $\theta$ and $\phi$. Table 1 and Table 2 show differences between a ratio of the circumferential length dimensions P to m used in the above description and a ratio of the open angles $\theta$ and $\phi$ of this embodiment.

Table 1 shows that magnetic poles are eight, the inner diameter of the rotor magnet 5 is 15.8 mm, the outer diameter of the stator 10 is 15.2 mm, and the air gap g is 0.3 mm. Table 2 shows that magnetic poles are eight, the inner diameter of the rotor magnet 5 is 16.2 mm, the outer diameter of the stator 10 is 15.2 mm, and the air gap g is 0.5 mm.

A difference between the ratio m/P in the circumferential length dimensions and the ratio $\phi/\theta$ in the open angles is not so large when the air gap g is small and the motor diameter is large, but this difference becomes large when the air gap g is large and the motor diameter is small.

As to the optimum range of a ratio of both open angles, the lower limit of the range is that φ/θ×100 which approximately corresponds to 70% of the ratio m/P in the circumferential length is 75%. And the upper limit of the range is that φ/θ×100 is less than 100% as it is appropriate when adjacent magnetic poles do not contact to each other. As described afterward, in view of the relation with the shifting of a magnetic pole sensing element 21, a ratio of the open angle φ of the magnetic pole to the open angle θ per pole, or a range of φ/θ, is preferably 75% or more and less than 100%. And a test result indicated that it is optimum when close to 85%.

Preferable starting of the above structured brushless DC motor 1 will be described with reference to FIG. 43 and FIG. 44.

Figure 43:
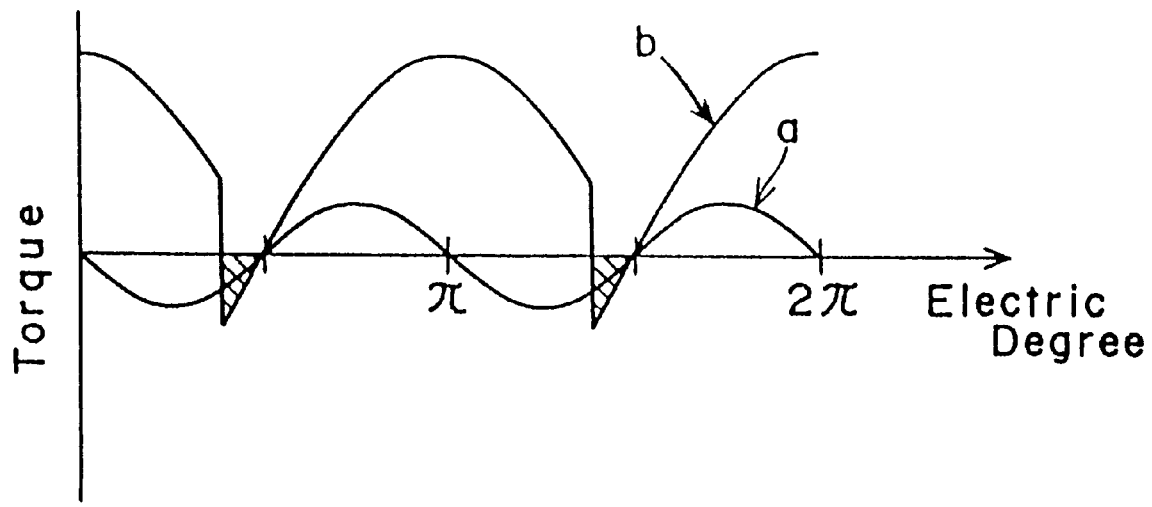
FIG. 43 An explanatory view describing the excitation torque according to a thirteenth embodiment of this invention.
Figure 44:
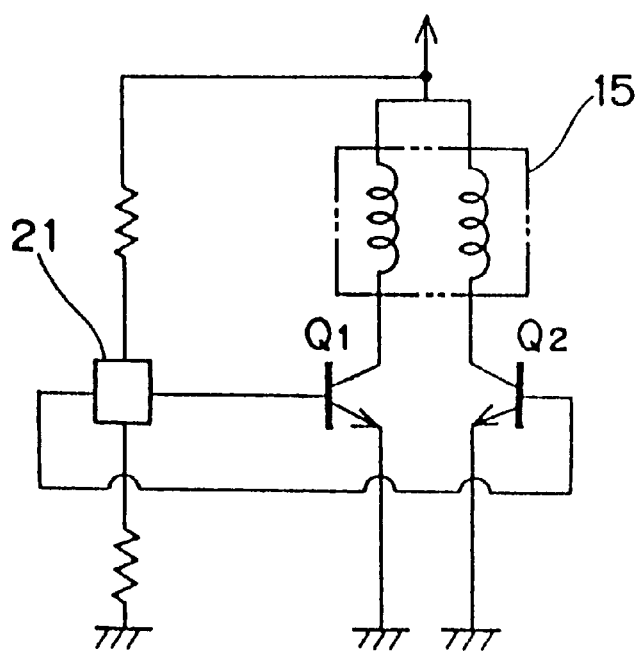
FIG. 44 A circuit diagram showing one embodiment of the drive circuit of the brushless DC motor according to a thirteenth embodiment of this invention.

FIG. 43 is a chart showing the relation of a cogging torque and an excitation torque of the brushless DC motor 1, in which the horizontal line denotes an electric angle and the vertical line a torque. Reference code a represents a cogging torque, and b an excitation torque. Stable points are 0, π, and 2π. FIG. 44 is a circuit diagram showing one example of the driving circuit for the brushless DC motor 1, in which a hall element 21 detects S or N pole of the rotor magnet 5 to turn ON or OFF a transistor Q1 or Q2, to pass an electric current through a coil 15 alternately, and to excite each magnetic pole 11a, 16a of the stator 10.

Returning to FIG. 39 and FIG. 40, the set position of the hall element 21 will be described. The hall element 21 for switching an exciting current is disposed at a position shifted to the opposite side from a desired revolving direction from the middle of the magnetic pole 11a and the magnetic pole 16a. In this embodiment, since the revolving direction is counterclockwise, the hall element 21 is shifted in the clockwise direction. Because the hall element 21 is shifted, the rotor 2 is slightly revolved reversely at the early stage of starting, but the exciting current is immediately switched to effect a desired revolution. The hall element 21 in FIG. 43 is positioned shifted by 20 degrees in electric angle. For example, when the rotor 2 is revolved counterclockwise, the hall element 21 is shifted toward the magnetic pole 11a. Detecting S pole of the rotor magnet 5 and exciting to make the magnetic pole 11a to be S pole and the magnetic pole 16a to be N pole allow the repulsive attraction to revolve the rotor counterclockwise. When the rotor magnet 5 is positioned as shown in FIG. 40, it is in a state to revolve counterclockwise, too. But, even if it revolves clockwise, the hall element 21 detects N pole of the rotor magnet 5 to switch the excitation, causing it to revolve counterclockwise. In the above state, the torque falls in the shadowed portions to prevent the revolving direction as in FIG. 43. When the hall element 21 is shifted to a large extent, a torque preventing the revolution is increased, having adverse effects on torque and revolution characteristics. Therefore, shifting is preferably 45 degrees in electric angle.

And, when the hall element 21 is positioned at a neutral point (no shifting) of the cogging torque which is at the middle of both magnetic poles 11a, 16a, the aforementioned torque for braking is lost, but a dead point is generated and starting cannot be made. Therefore, shifting has to be greater than zero. Preferably, shifting is 5 degrees or more in view of an assembling error.

Further, the ratio φ/θ of the open angle of the magnetic pole will be discussed in view of the starting of the motor, motor characteristics, and shifting of the magnetic pole sensing element 21 with reference to Table 3. Table 3 shows the results of tests made by the inventors. The motor of this embodiment is small, and when a magnetic pole width is increased, magnetic leakage easily occurs between the adjacent magnetic poles, and it excels in starting, but the motor characteristics are inferior in magnetic leakage as compared with a case that a magnetic pole width is narrow. However, when the motor is enlarged and a space between magnetic poles is increased proportionally, the motor characteristics can be satisfied fully differing from Table 3. With a magnetic pole width of 70% or below, a stable point of the rotor magnet 5 appears in the state shown in FIG. 40, causing a problem in the starting performance. With a magnetic pole width of 60 to 70%, starting can be made by increasing a gap between the rotor magnet 5 and the magnetic poles 11a, 16a and decreasing a cogging torque, but reliability is slightly inferior. With a magnetic pole width of 45 to 55%, starting can not be made by the structure described in this embodiment, but it seems that the starting performance can be secured by, for example, disposing a plurality of magnetic pole sensing elements 21, one at the position described in this embodiment and another one at a position about 30 to 60 degrees away in electric angle, and making a cogging torque small. Doing as described above is hard to secure the starting when a magnetic pole width is 40% or below. And, when the shifting of the magnetic pole sensing element 21 is greater than 45 degrees, it is not preferable because a torque for braking increases and the motor characteristics are-deteriorated, but it seems to be usable depending on where it is used when the shifting is up to 90 degrees.

Realistically, it is seen that the ratio of an open angle φ of the magnetic pole to an open angle θ per pole of the rotor magnet, or a range of φ/θ, is desirably 75% or more and less than 100%, and further the optimum range is around 85% as shown in Table 3.

The embodiment of the four-pole outer rotor brushless DC motor has been described above, but it is to be understood that the same effect can be obtained when the pole number is two, six, eight or more, and the motor is an inter rotor type. And, it is also possible to apply to the above first to twelfth embodiments.

Thus, according to this embodiment, the rotor's stable point can be placed at the maximum excitation torque position, and stable self-starting and high starting torque can be obtained by arranging the open angle of the magnetic pole of the rotor to be 75% or more and less than 100% of the open angle per pole of the rotor magnet.

And, since the motor has a structure in which the magnetic poles have a simple shape of a rectangle or trapezoid and the same shaped stator yokes are combined to oppose, there are effects that its production is easy, its productivity is remarkable, realizing a low price, and its performance is remarkable.

Figure 45:
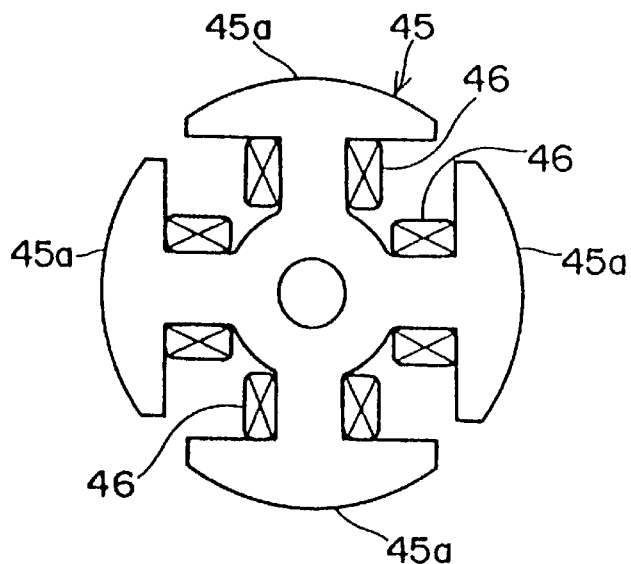
FIG. 45 A plan view of the stator yoke according to a fourteenth embodiment of this invention.
Figure 46:
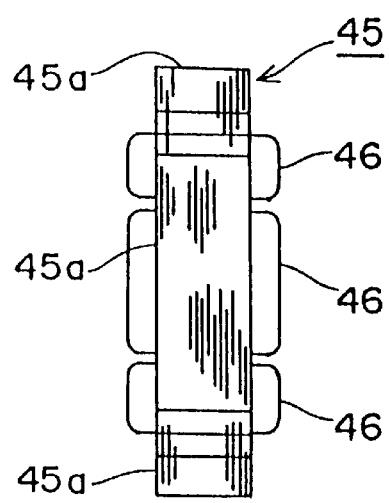
FIG. 46 A side view of the stator yoke according to a fourteenth embodiment of this invention.

Now, a fourteenth embodiment of this invention will be described. In this embodiment, the brushless DC motor has its rotor and stator fabricated by layering steel plates differing from the first to thirteenth embodiment. FIG. 45 and FIG. 46 show a stator of this embodiment. And, FIG. 48 and FIG. 49 show a rotor 47 of this embodiment.

As shown in FIG. 45 and FIG. 46, the stator of this embodiment has a stator yoke 45 structured by layering many steel plates which have been punched out into a certain shape, there are four poles, and the magnetic pole width is structured to meet the same conditions as in the previous embodiment. A magnetic field coil 46 is disposed on each magnetic pole 45a of the stator yoke 45.

Figure 47:
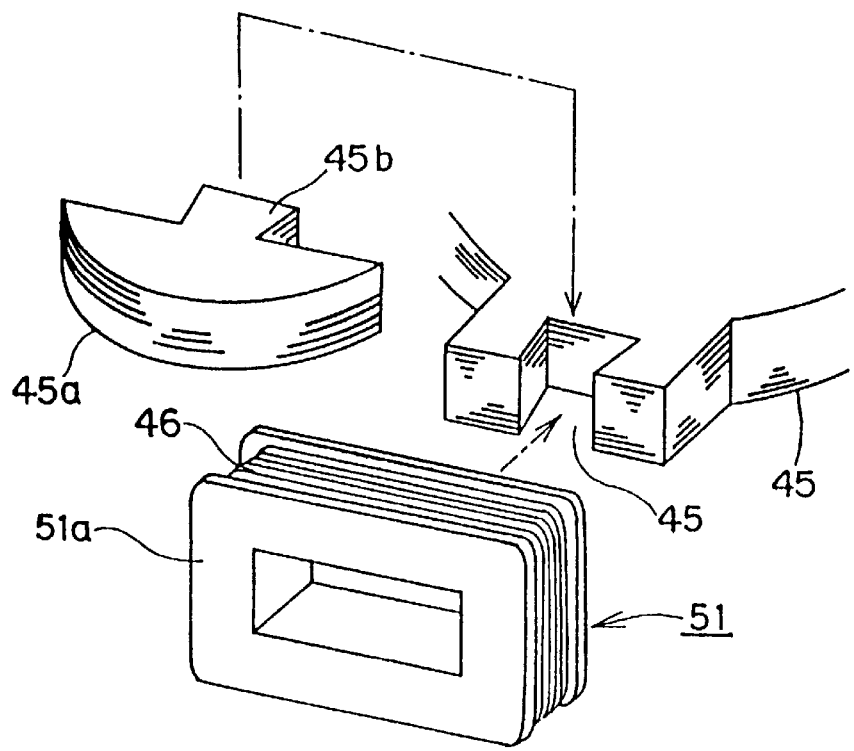
FIG. 47 An exploded perspective view of the essential part according to a fourteenth embodiment of this invention.

As to a structure of each magnetic pole 45a of the stator yoke 45, magnet pole sections separately formed by layering may, be put together as shown in FIG. 47. The stator yoke 45 of FIG. 47 is an improvement of the stator yoke 45 of FIG. 45. A coil unit 51 is structured by the magnetic field coil 46 wound around a bobbin 51*a* made of resin, and fitted to a leg 45*d* of the magnetic pole 45*a*, then an end part 45*b* of the magnetic pole 45*a* is fitted to a fitting part 45*c*. This structure has effects that the stator yoke 45 shown in FIG. 47 is sufficient by winding on the bobbin, so that workability of winding is improved and productivity is superior, while winding has to be made on the leg of each magnetic pole in case of the shape shown in FIG. 45.

Figure 48:
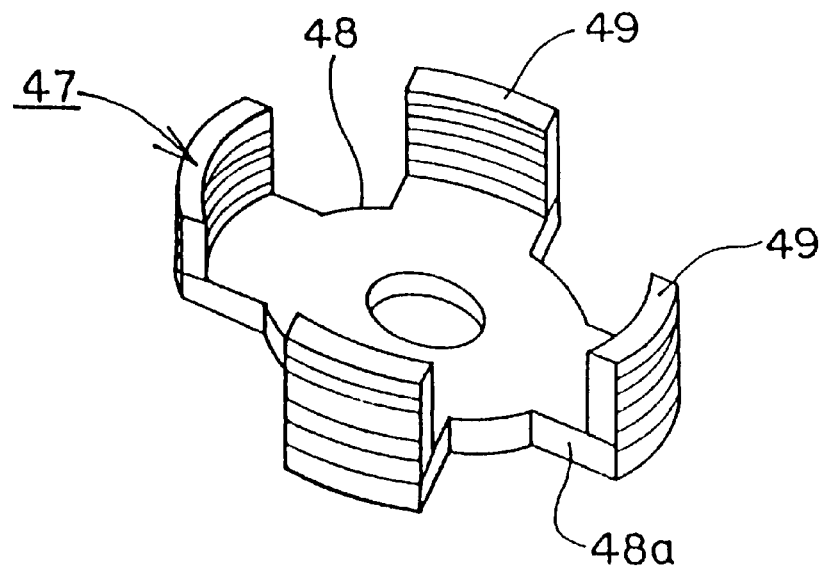
FIG. 48 A perspective view of the stator yoke according to a fourteenth embodiment of this invention.
Figure 49:
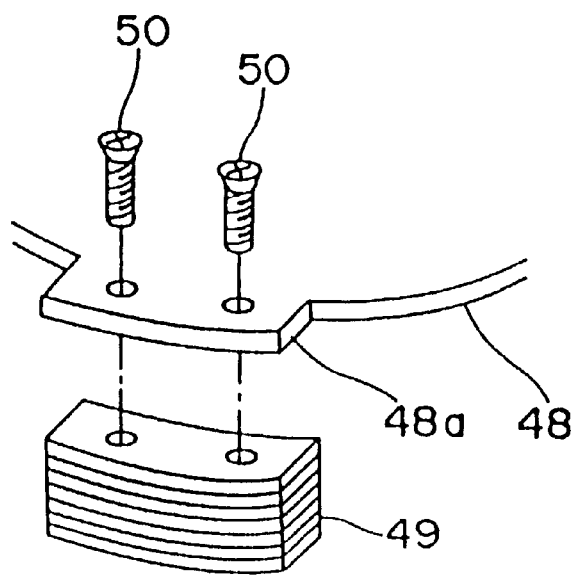
FIG. 49 An exploded perspective view of the essential part of the stator yoke according to a fourteenth embodiment of this invention.
Figure 50:
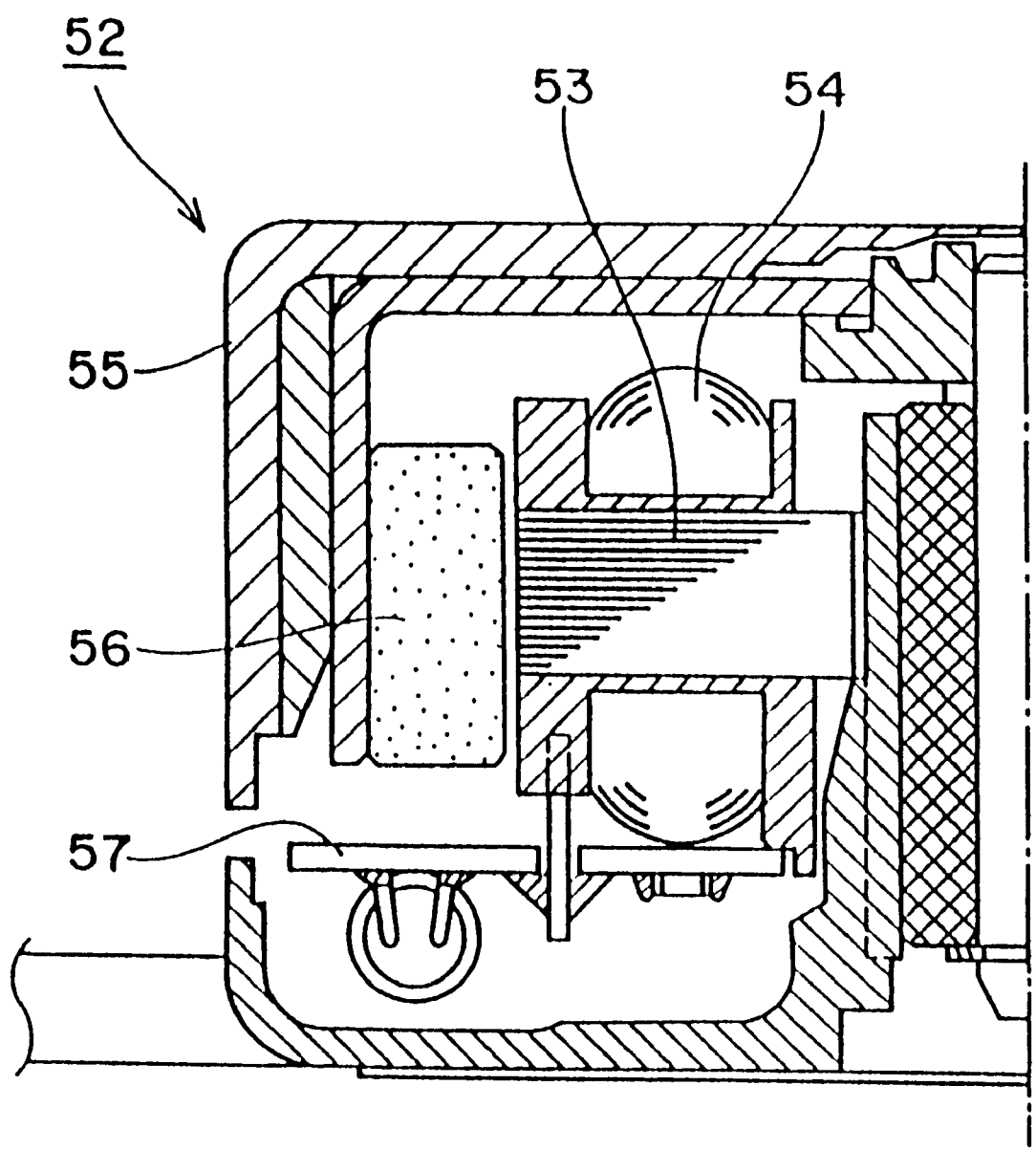
FIG. 50 A vertical sectional view showing the structure of a conventional core type brushless DC motor.
Figure 51:
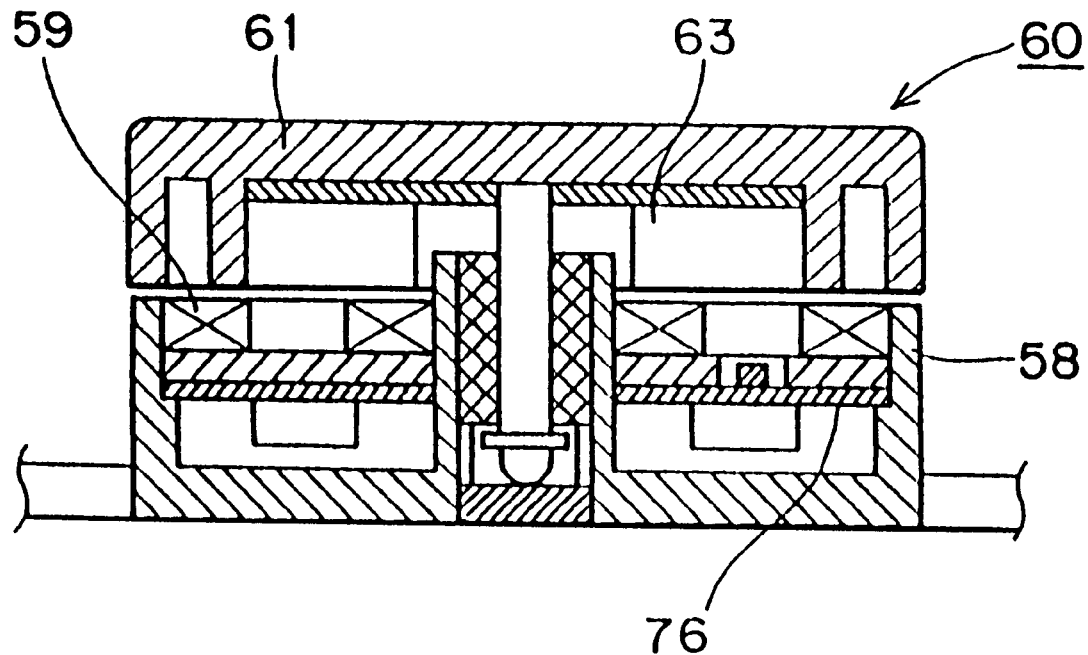
FIG. 51 A vertical sectional view showing the structure of a conventional coreless type brushless DC motor.
Figure 52:
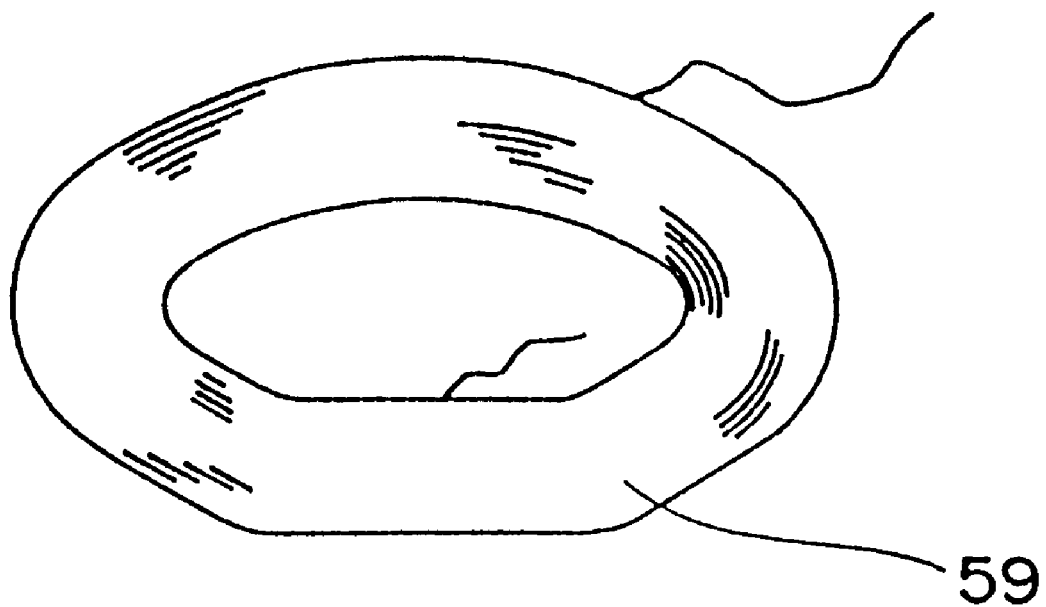
FIG. 52 A plan view of the magnetic field coil of a conventional coreless type brushless DC motor.
Figure 53:
FIG. 53 A front view of the magnetic field coil of a conventional coreless type brushless DC motor.
Figure 54:
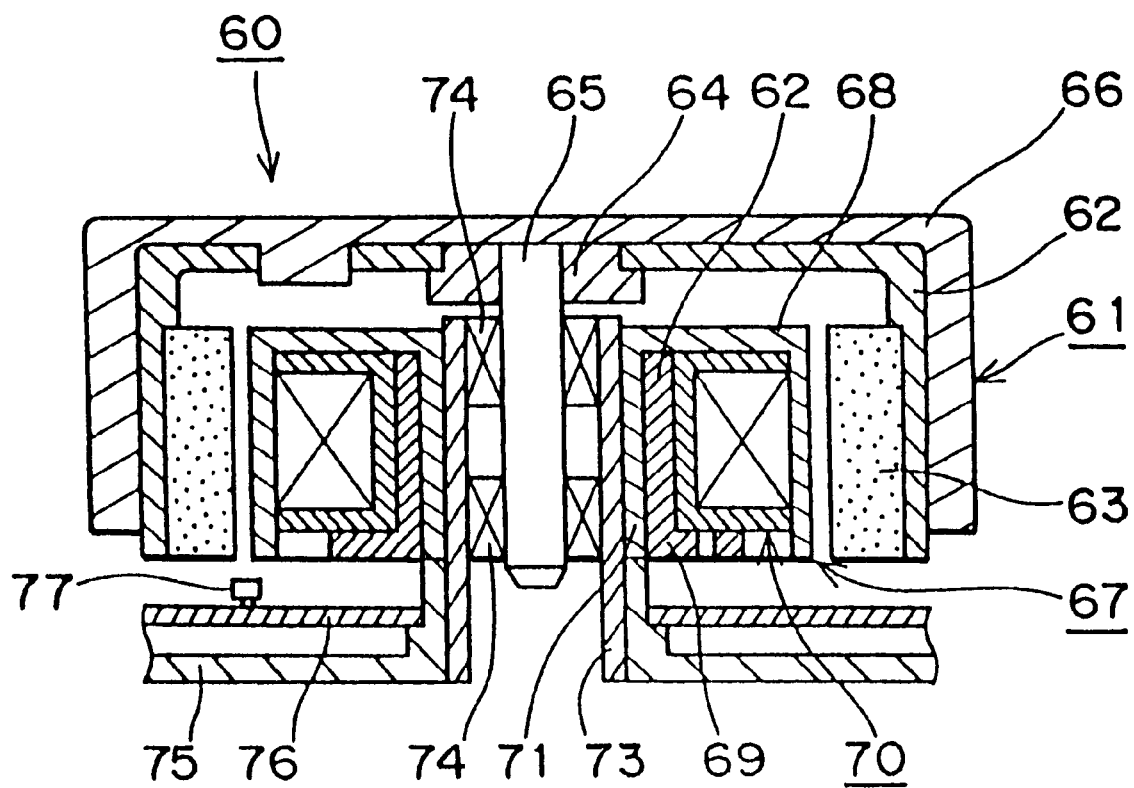
FIG. 54 A vertical sectional view showing a conventional coreless type brushless DC motor.
Figure 55:
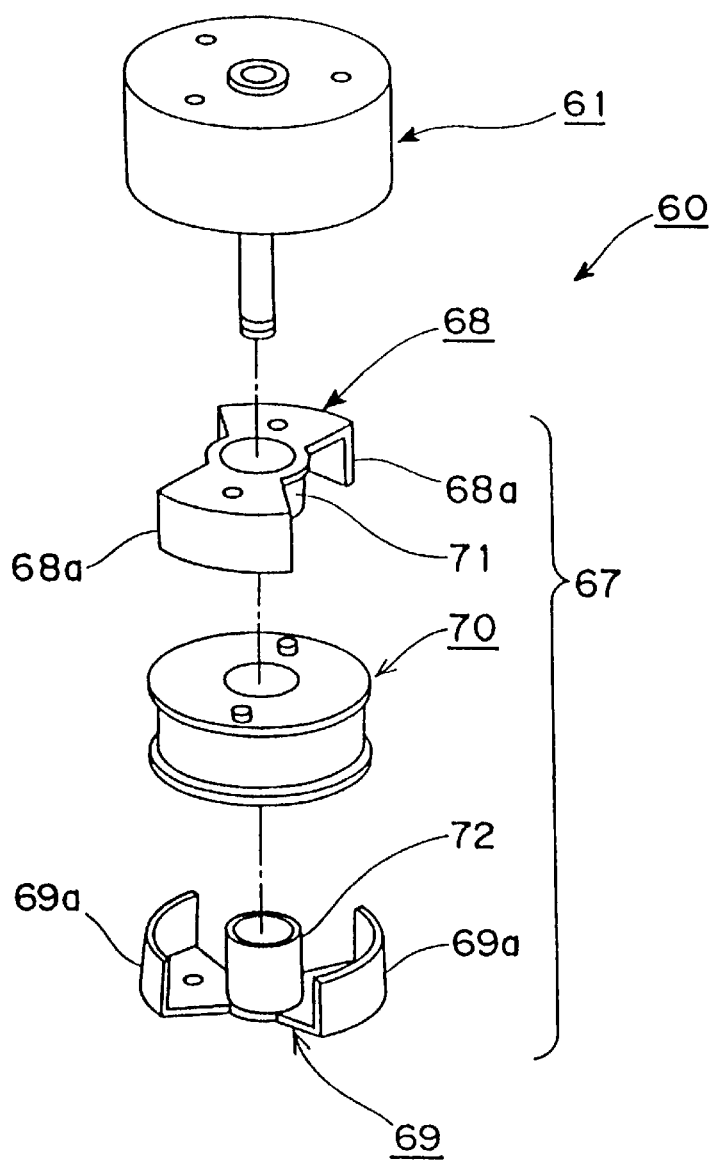
FIG. 55 An exploded sectional view showing a conventional coreless type brushless DC motor.
Figure 56:
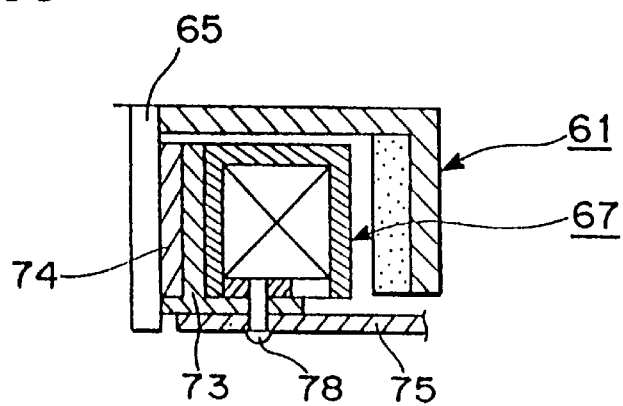
FIG. 56 A vertical sectional view showing the essential part of a conventional coreless type brushless DC motor.
Figure 57:
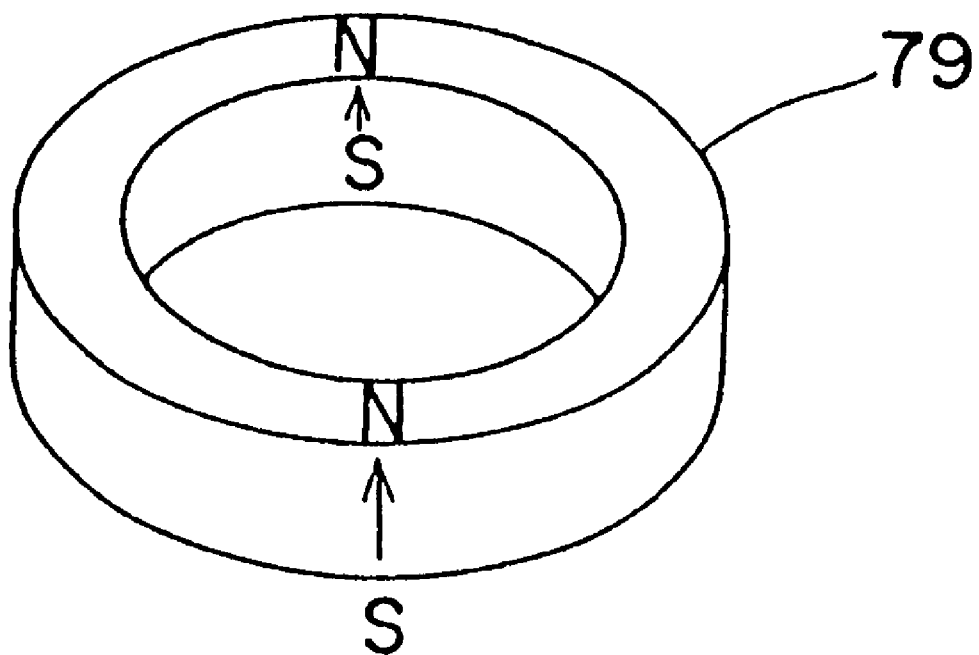
FIG. 57 A perspective view of the chucking magnet of a conventional coreless type brushless DC motor.

And, a stator yoke 47 may be structured as shown in FIG. 48 and FIG. 49. FIG. 48 is not a rotor. The stator yoke 47 of FIG. 48 is realized in a layered structure having the same shape with the stator yoke 11 or 16 described with reference to FIG. 1 or FIG. 19. The stator yoke 11 or 16 described with reference to FIG. 1 or FIG. 19 has the magnetic pole 11*a* or 16*a* formed by bending a soft magnetic material which has been punched out into a desired shape, while the stator yoke 47 of FIG. 48 has a structure realizing the same effect by attaching a stator yoke substrate 48 punched out into a desired shape to a magnetic pole 49 which is prepared by stacking many plates punched out into a desired shape through a fitting part 48*a* by means of a fixing means such as pins, or screws. In FIG. 48 and FIG. 49, the stator yoke substrate 48 is single but may be used in the plural number in view of magnetic saturation and strength. The fixing means of the magnetic pole 49 may be welding. With this stator yoke 47, an eddy current loss of the stator yoke occurring when the motor runs at a high speed, the so-called core loss, can be reduced, and as the stator yoke is produced by punching, high precision is easily obtained, excelling in productivity.

As to the brushless DC motor, the magnetic poles of the stator yoke can be made by bending as described in the aforementioned embodiment or may be formed by the multilayered steel plates as in this embodiment, and the rotor magnet is not limited to be made of many segments but can also be applied to a motor produced by casting or sintering. And, the outer rotor type motor having a radial gap structure has been described in this embodiment, but this invention covers all sorts of embodiments such as an inner rotor type and axial gap structure to accomplish the similar objects.

INDUSTRIAL APPLICABILITY

In view of the above description, the brushless DC motor of this invention can be particularly applied to a small motor, and is preferable to improve the starting of a brushless motor.

We claim:

1. A brushless DC motor comprising:

a rotor having a shaft disposed at the center of a rotor yoke and a ring- or segment-shaped rotor magnet magnetized in plural poles in the circumferential direction, a stator having a pair of stator yokes, which have magnetic poles formed by bending a soft magnetic metal plate, put together to oppose each other, these stator yokes having an air gap next to the rotor magnet and having the magnetic poles disposed alternately in the circumferential direction, a coil unit which is disposed between the pair of stator yokes and has a magnetic field coil disposed on a synthetic resin coil bobbin having a flange at ends, and a circuit unit which is attached to a base plate and has a magnetic pole sensing element disposed for detecting a magnetic pole of the rotor magnet, characterized by protruding a terminal pin to which the leading end of the magnetic field coil is tied on the flange of the coil bobbin, disposing fitting holes for the terminal pin in the stator yokes and the base plate, attaching the circuit unit to the base plate from the outside on the opposite side of the stator, and disposing a groove on a supporting part of the terminal pin to guide the terminal of the magnetic field coil wherein the terminal pin is disposed in the plural number on the same circumference with the shaft at the center, and an interval between the neighboring terminal pins is arranged at an equal pitch.

2. A brushless DC motor comprising:

a base plate having an upright support;

a rotor including a dish-shaped rotor yoke having a central hole and a side face, and a rotor magnet disposed on said side face of said rotor yoke;

a shaft fixed to said central hole of said rotor yoke for rotatably supporting said rotor with respect to said base plate;

a stator having a pair of opposed stator yokes disposed next to said rotor magnet with an air gap between them and having magnetic poles disposed alternately in the circumferential direction;

a coil unit including a synthetic resin coil bobbin with flanges disposed between the stator yokes and a magnetic field coil disposed on said coil bobbin between said flanges;

a circuit unit attached to said base plate from outside with respect to said stator and has a magnetic pole sensing element disposed so as to detect a magnetic pole of the rotor magnet;

a plurality of terminal pins extending downwardly from one of said flanges, arranged at regular intervals in circumferential direction, and connected to a leading ends of said magnetic field coils;

fitting holes provided in at least one of said stator yokes and said base plate for receiving said terminal pins; and grooves provided on said one of said flanges adjacent to said terminal pins to guide said leading ends of said magnetic field coils.

3. A motor comprising:

a rotor having a shaft disposed at the center of a rotor yoke and a ring- or segment-shaped rotor magnet magnetized in plural poles in the circumferential direction, a stator having a pair of stator yokes, which have magnetic poles formed by bending a soft magnetic metal plate, put together to oppose each other, these stator yokes having an air gap next to the rotor magnet and having the magnetic poles disposed alternately in the circumferential direction, a coil unit which is disposed between the pair of stator yokes and has a magnetic field coil disposed on a synthetic resin coil bobbin having a flange at ends, characterized by protruding a terminal pin to which the leading end of the magnetic field coil is tied on the flange of the coil bobbin, disposing fitting holes for the terminal pin in the stator yokes, and disposing a groove on a supporting part of the terminal pin to guide the terminal of the magnetic field coil, wherein the terminal pin is disposed in the plural number on the same circumference with the shaft at the center, and an interval between the neighboring terminal pins is arranged at an equal pitch.

4. A motor according to claim 3, which further comprises a positioning pin provided on said flange of said coil bobbin for assembling said pair of stator yokes.

* * * * *